United States Patent [19]

Smith et al.

[11] Patent Number: 5,583,949
[45] Date of Patent: Dec. 10, 1996

[54] APPARATUS AND METHOD FOR USE IN IMAGE PROCESSING

[75] Inventors: Raymond W. Smith; Christopher J. Robson, both of Bristol, England

[73] Assignee: Hewlett-Packard Company, Palo Alto, Calif.

[21] Appl. No.: 468,517

[22] Filed: Jun. 6, 1995

Related U.S. Application Data

[63] Continuation of Ser. No. 956,593, Oct. 5, 1992, abandoned, which is a continuation of Ser. No. 373,137, Jun. 28, 1989, abandoned.

[30] Foreign Application Priority Data

Mar. 3, 1989 [EP] European Pat. Off. ............. 89302122

[51] Int. Cl.$^6$ ................................................... G06K 9/48
[52] U.S. Cl. .......................................... 382/199; 382/203
[58] Field of Search .................................. 382/199, 198, 382/200, 190, 203, 204; 358/455, 456

[56] References Cited

U.S. PATENT DOCUMENTS

| | | | |
|---|---|---|---|
| 3,925,760 | 12/1975 | Mason et al. | 340/146.3 ED |
| 4,213,150 | 7/1980 | Robinson et al. | 358/166 |
| 4,504,969 | 3/1985 | Suzuki et al. | 382/25 |
| 4,566,124 | 1/1986 | Yamamoto et al. | 382/21 |
| 4,680,805 | 7/1987 | Scott | 382/22 |
| 4,712,248 | 12/1987 | Hongo | 382/16 |
| 4,754,489 | 6/1988 | Bokser | 382/36 |
| 4,833,721 | 5/1989 | Okutomi et al. | 382/21 |
| 4,899,225 | 2/1990 | Sasuga et al. | 358/462 |
| 5,131,053 | 7/1992 | Bernzott et al. | 382/22 |
| 5,185,809 | 2/1993 | Kennedy et al. | 382/22 |

OTHER PUBLICATIONS

L. T. Watson et al., "Extraction of Lines and Regions for Gray Tone Line Drawing Image" *Pattern Recognition*, 1984, vol. 17. No. 5, pp. 493–507.

A. D. C. Holder, et al., "A Feasible Computer System for Grey Level, Pictorial Pattern Recognition", *Pattern Recognition*, Sep. 1975, vol. 3, pp. 147–156.

J. G. Leu, et al., "Polygonal Approximation of 2–D shapes . . . " *Pattern Recognition Letters*, Apr. 1988, vol. 7, No. 4, pp. 231–238.

E. Hundt, "Digital Image Processing . . . " *Siemens Forschungs*, 1983, vol. 12, No. 4, pp. 250–257.

K. Yamamoto, "Recognition of Handprinted Characters . . . " *IEEE Proceedings*, Dec. 4, 1980, vol. I, pp. 708–711.

S. N. Biswas, et al., "Region Symmetry Analysis . . . " *IEEE Proceedings*, Oct. 31, 1986, pp. 427–429.

A. Kundu, et al., "Recognition of Handwritten Script . . . " *IEEE Proceedings*, Apr. 14, 1988, vol. II, pp. 928–931.

*Primary Examiner*—Yon J. Couso

[57] ABSTRACT

Optical character recognition is achieved by a system which comprises a scanner for scanning a document, an edge extractor for identifying edges in the image produced by the scanner to produce an outline of each object identified in the image, a segmentation facility for grouping the object outlines into blocks, means for identifying features of the outlines, and a final classification stage for providing data in an appropriate format representative of the characters in the image. Also disclosed are a novel edge extractor, a novel page segmentation facility and a novel feature extraction facility.

34 Claims, 15 Drawing Sheets

```
FFFFFFFFFFFFFFFFFFF
FFFFFFECA89BDFFFFFF
FFFFFA42211236DFFFF
FFFD63689831115EFFFF
FFF52BFFFFD61019FFFF
FFF45FFFFFFF5003FFFF
FFFBEFFFFFFFB102EFFF
FFFFFFFFFFFFD201EFFF
FFFFFFFFFFED7101EFFF
FFFFFFDA84442002EFFF
FFFF952259BEA102FFFF
FFF6116CFFFFD203FFFF
FF8105FFFFFFD102FFFF
FE301CFFFFFFD103FFFF
F9102EFFFFFFC102FFFF
F8002EFFFFFF7102FFFF
F9101 9FFFFE72003FFFF
FC20029BB957A202EFFF
FF82011124AED2017DFF
FFFA42126EFFF53335BF
FFFFFEDEFFFFFFFEFFF
FFFFFFFFFFFFFFFFFFF
```

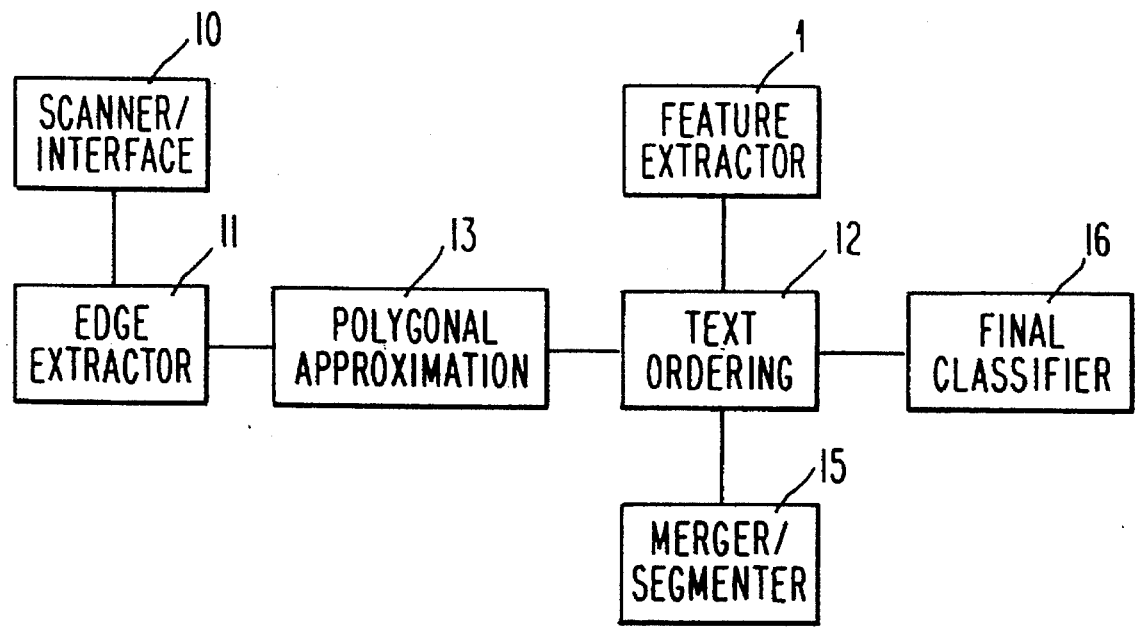

Fig. 1

```
FFFFFFFFFFFFFFFFFFFF
FFFFFFECA89BDFFFFFFF
FFFFFA42211236DFFFFF
FFFD63689831115EFFFF
FFF52BFFFFD61019FFFF
FFF45FFFFFFF5003FFFF
FFFBEFFFFFFFB102EFFF
FFFFFFFFFFFD201EFFF
FFFFFFFFFFED7101EFFF
FFFFFFDA84442002EFFF
FFFF952259BEA102FFFF
FFF6116CFFFFD203FFFF
FF8105FFFFFFD102FFFF
FE301CFFFFFFD103FFFF
F9102EFFFFFFC102FFFF
F8002EFFFFFF7102FFFF
F91019FFFFE72003FFFF
FC20029BB957A202EFFF
FF82011124AED2017DFF
FFFA42126EFFF53335BF
FFFFFEDEFFFFFFFFEFFF
FFFFFFFFFFFFFFFFFFFF
```

Fig. 2B

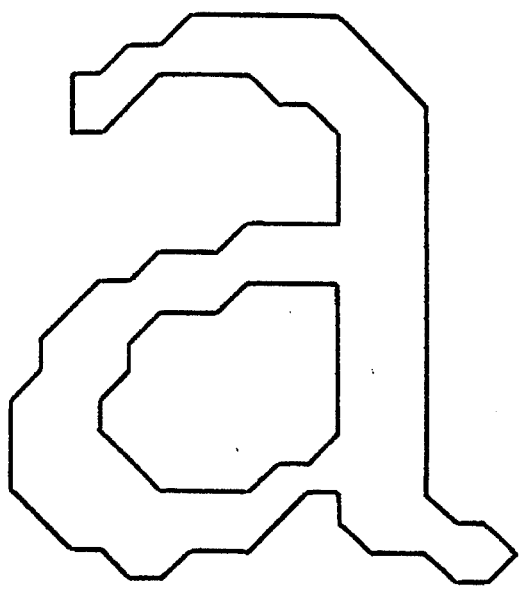
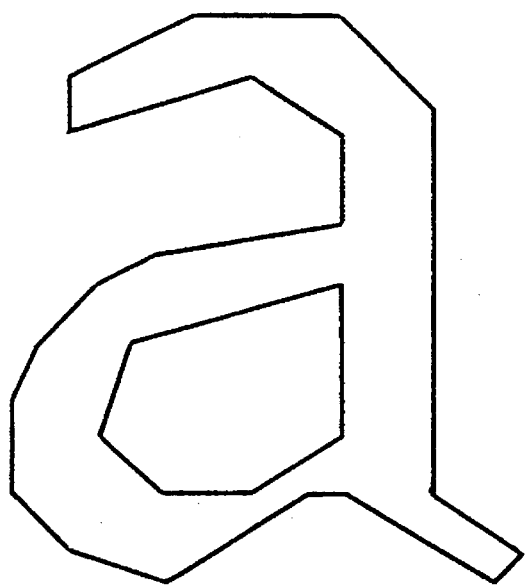
Fig. 3(a)　　　　　Fig. 3(b)
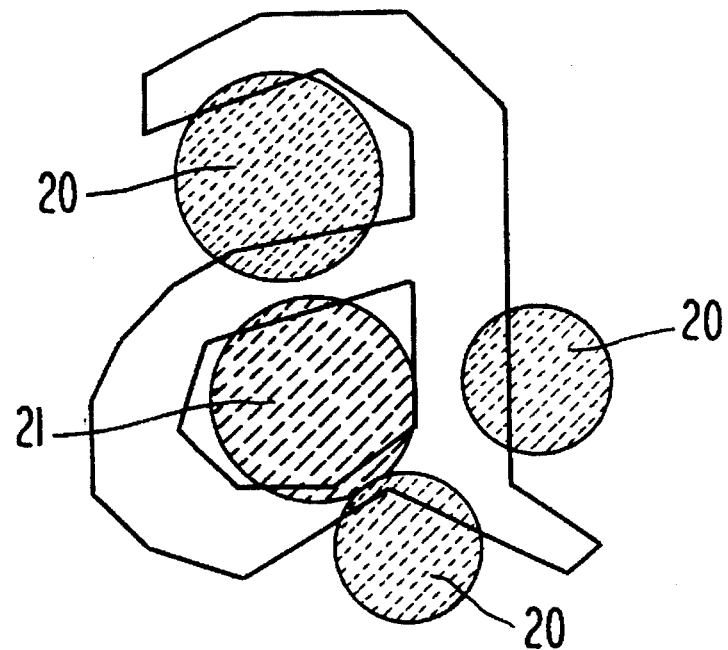
Fig. 4

Fig. 6(a)

| 5 | 6 | 7 |
|---|---|---|
| 4 | X | 0 |
| 3 | 2 | 1 |

Fig. 6(b)

|  | -1 |
|---|---|
| CURRENT POINT | NEXT POINT |
|  | 1 |

Fig. 6(c)

| -1 | NEXT POINT |
|---|---|
| CURRENT POINT | 1 |

Fig. 7(a)

| 15 | 15 | 15 | 15 | 15 |
|---|---|---|---|---|
| 15 | 14 | 12 | 10 | 8 |
| 10 | 4 | 2 | 2 | 1 |
| 3 | 6 | 8 | 9 | 8 |
| 11 | 15 | 15 | 15 | 15 |

82 → 12, 81 → 10, 80 (labels)

Fig. 7(b)

| 3 | 0 |  |
|---|---|---|
| 13 | ○ |  |
| 10 | 1 |  |

Fig. 7(c)

| 1 | 0 |  |
|---|---|---|
| 11 | □ |  |
| 12 | 2 |  |

Fig. 7(d)

| 4 |  |  |
|---|---|---|
| 12 | ◇ |  |
| 4 | -5 | 4 |

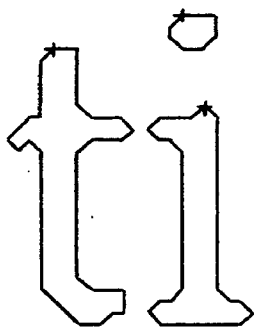
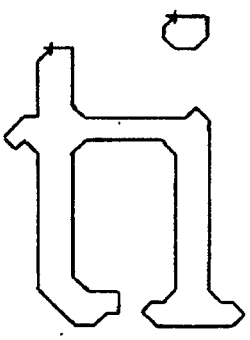
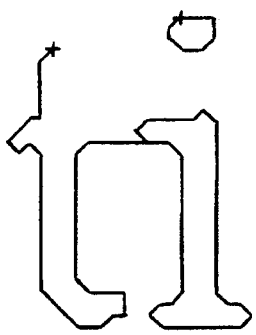
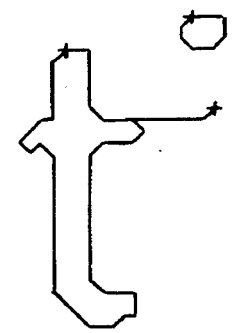
Fig. 8(a)　Fig. 8(b)　Fig. 8(c)　Fig. 8(d)
Fig. 9(a)　Fig. 9(b)　Fig. 9(c)　Fig. 9(d)
Fig. 10(a)　Fig. 10(b)

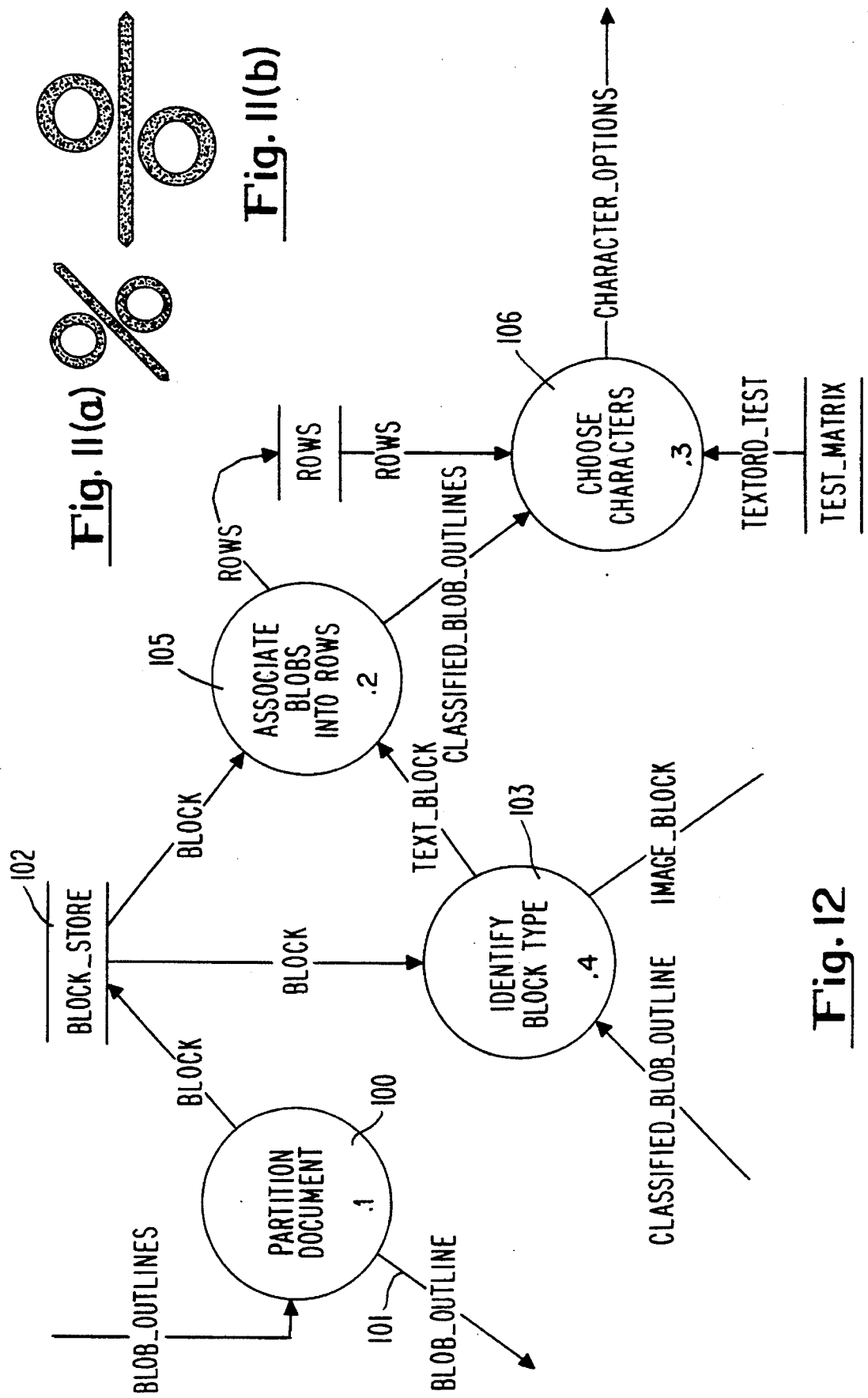

A CONCAVITY WITH A SPLIT

THE TRAPEZIUM MADE FROM A CONCAVITY

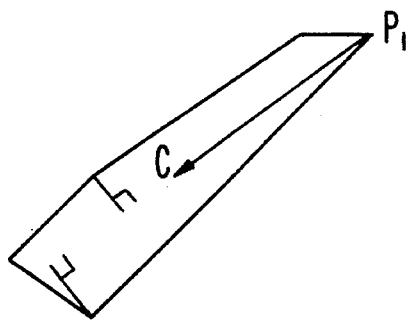
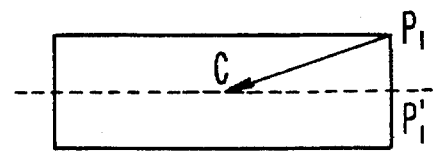
Fig. 17(a)  Fig. 17(b)
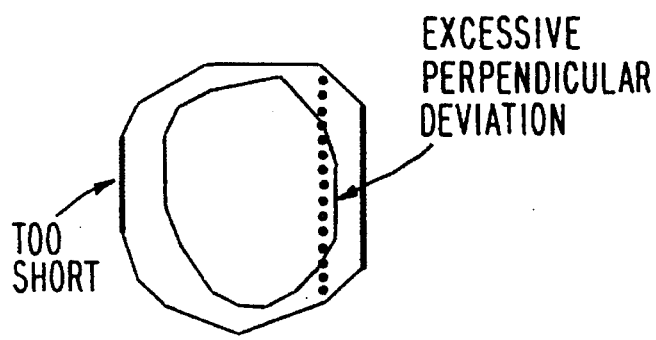
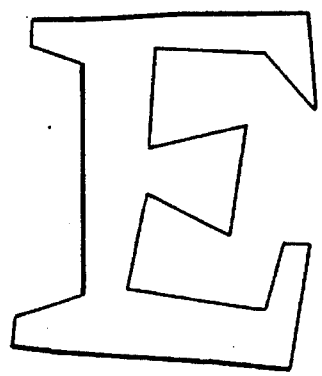
Fig. 18(a)  Fig. 18(b)
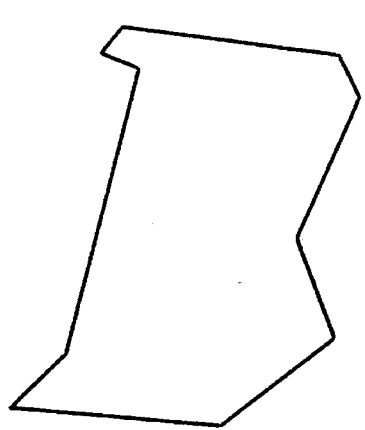
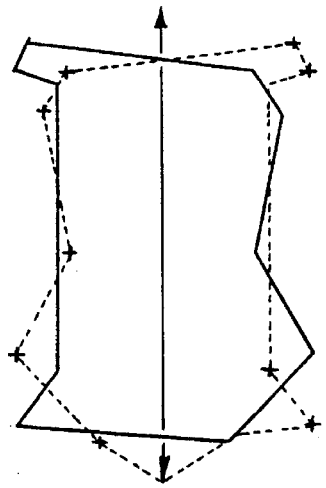
Fig. 19(a)  Fig. 19(b)

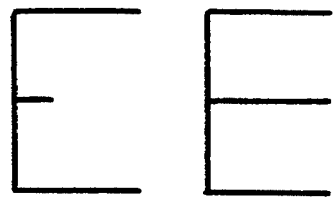
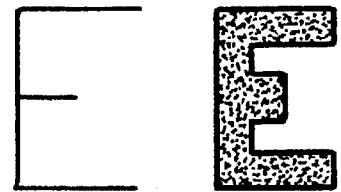
Fig. 23(a)   Fig. 23(b)
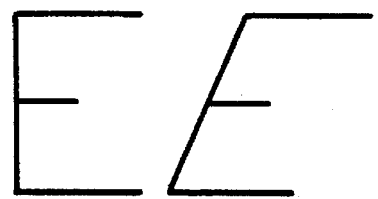
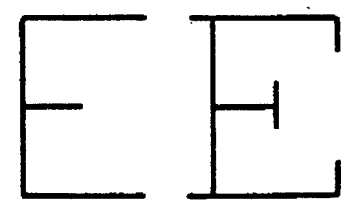
Fig. 23(c)   Fig. 23(d)
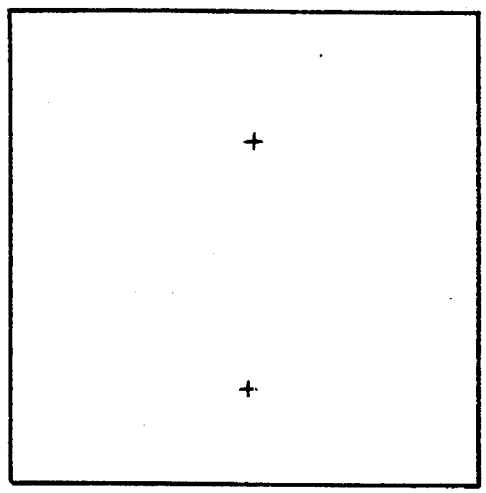
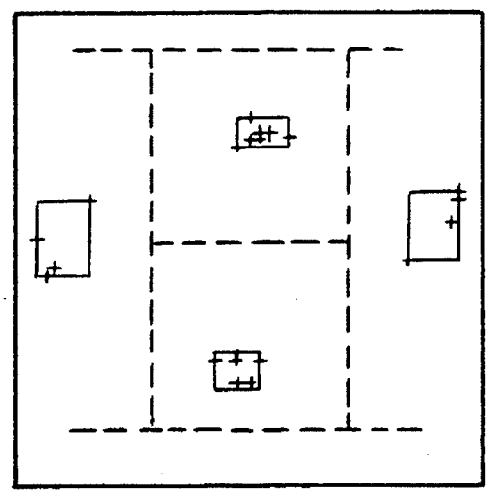
Fig. 25(a)   Fig. 25(b)

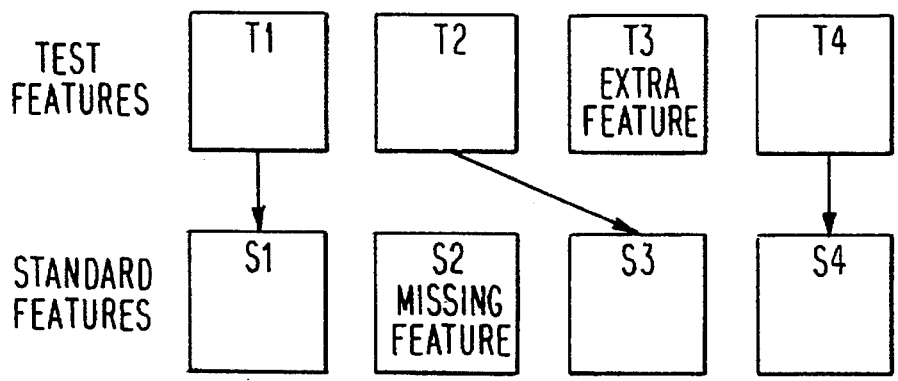
Fig. 26
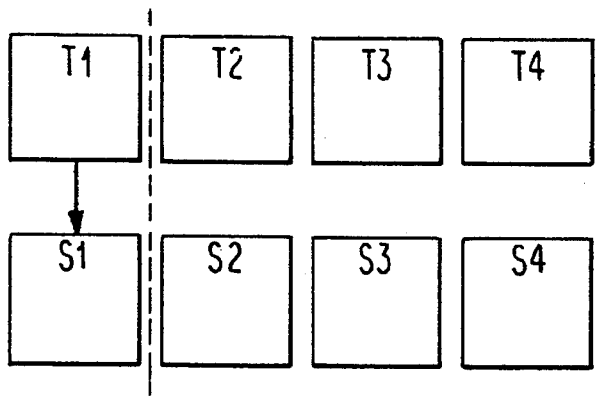
Fig. 27(a)
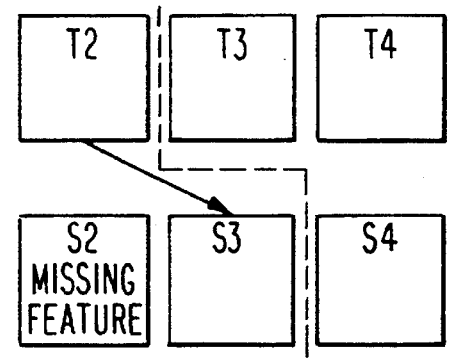
Fig. 27(b)
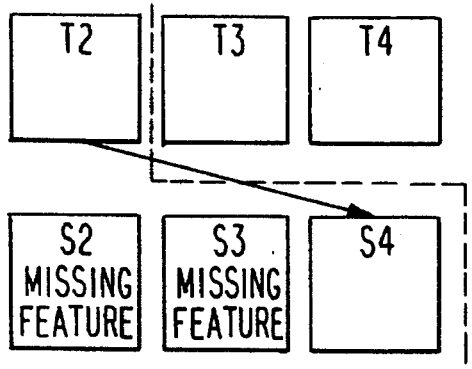
Fig. 27(c)
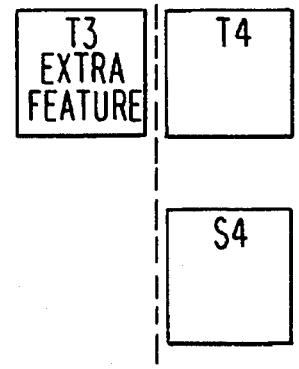
Fig. 27(d)
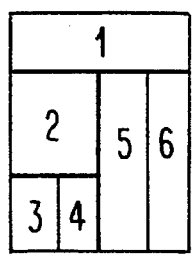 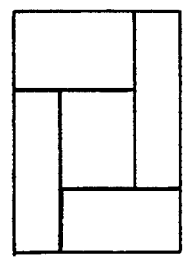
Fig. 28(a)   Fig. 28(b)

APPARATUS AND METHOD FOR USE IN IMAGE PROCESSING

This is a continuation of application Ser. No. 07/956,593, filed Oct. 5, 1992 now abandoned, which is a continuation of application Ser. No. 373,137, filed Jun. 28, 1989, now abandoned.

This invention relates generally to the field of optical character recognition.

BACKGROUND OF THE INVENTION

Optical character recognition devices read text from a printed page and produce an output representative of the text in an appropriate format, e.g. ASCII code. There are two basic techniques available in optical character recognition. One is based on matrix matching and the other on feature extraction. Matrix matching involves comparing a bit mapped image of a character with a set of templates. A major disadvantage of matrix matching is that it is limited to certain fonts and is very susceptible to character spacing. This is a particular drawback in relation to proportionally spaced characters.

Feature extraction involves recognition of selected features of characters and comparison of those features with stored versions of the features on which the system has been trained. Techniques based on feature extraction have the advantage that they are better able to read many different fonts. However known feature extraction methods are complex to implement and have a slow operating speed.

The present invention provides novel aspects which have particular application to optical character recognition based on feature extraction. Some of these methods and apparatus have more general application in the field of image processing.

SUMMARY OF THE INVENTION

A first aspect of the present invention provides an optical character recognition system comprising scanning means for optically scanning a document to produce an image thereof, means for identifying edges within said image and for identifying edge paths to produce data indicative of the outline of each object identified in said image, and means for processing the data provided by said edge identifying means and arranged to provide data, in an appropriate format, representative of the characters in said image.

A second aspect of the present invention provides an edge extractor for producing data indicative of the outline of objects in a grey level image generated by an optical scanning device and which comprises a pixel array, said extractor being arranged to sequentially scan said image array for an edge and for each edge located trace an outline of the object associated with said edge, said edge extractor being arranged to locate edges by means of an edge operator which generates edge values for each pixel.

A third aspect of the present invention provides an image processing system of the type which scans a document and which produces data representative of the outline of each object identified on the document, said system including a page segmentation facility for identifying groups of said object outlines to form said outlines into blocks of outlines and for arranging said blocks into order.

A fourth aspect of the present invention provides an image processing system of the type which scans a document and which produces data representative of the outline of each object identified on the document, said system including a facility for processing said data to identify particular features of each outline and to classify the outlines into classes in accordance with the identified features.

A fifth aspect of the present invention provides a system for processing a document to produce data representative of characters on said document in which said document is scanned to produce an image thereof and an edge identifying means processes the image data to produce data representative of the outline object identified in the image, the system including a polygonal approximation facility for reducing the number of irregularities in each outline said polygonal approximation facility operating by following the outline of each object to identify a series of points on said outline having a predetermined characteristic, measuring the depth of the concavity between each adjacent pair of points and removing concavities having depths less than a given value.

A sixth aspect of the present invention provides a method of processing a document to produce data representative of characters on said document, said method comprising scanning said document to produce an image thereof, identifying edge paths in said image, and processing data representing said edge paths to provide data, in an appropriate format, representative of the characters in said image.

A seventh aspect of the present invention provides a method for processing data representing the edge outlines in an image of a document to produce polygonal approximation of said outline, said method comprising following each outline to identify a series of points along said outline which have a predetermined characteristic, measuring the depth of the concavity between each adjacent pair of points and removing concavities having depths less than a given value.

BRIEF DESCRIPTION OF THE DRAWINGS

The invention will be described now by way of example only with particular reference to the accompanying drawings. In the drawings:

FIG. 1 is a block schematic diagram of an optical character recognition system in accordance with the present invention;

FIGS. 2(A), 2(b), 3(a), 3(b) and 4 illustrate the operation of the system of FIG. 1;

FIGS. 6(a)–6(c), 7(a)–7(d), 8(a)–8(d), 9(a)–9(d), 10(a), 10(b), 11(a) and 11(b) illustrate the operation of the edge extractor of FIG. 5;

FIG. 12 is a block schematic of the text ordering part of the system of FIG. 1;

FIGS. 15(a), 15(b), 169(a), 16(b), 17(a), 17(b), 18(a), 18(b), 19(a), 19(b), 20, 21(a) and 21C. illustrate the way in which character features are identified;

FIGS. 23(a)–23(d) show several examples of the way in which a letter "E" can be represented;

FIGS. 25(a), 25(b), 26, 27(a)–27(d) illustrate the operation of the template generation facility;

FIGS. 28(a), 28(b), 29, 30 and 31 illustrate the operation of the segmentation and final classification stages.

DETAILED DESCRIPTION

Figure 2A:
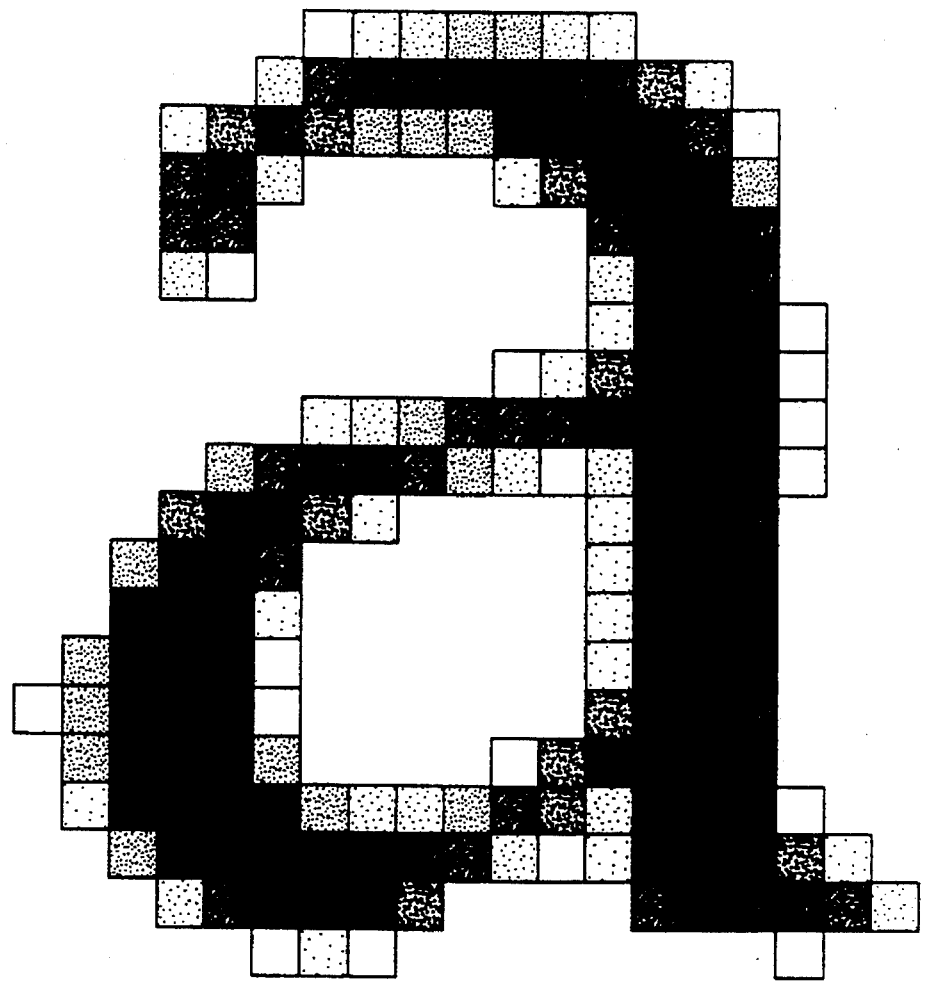

Referring to FIG. 1 an optical character recognition system comprises a scanner and scanner interface 10, an edge extractor 11, a polygonal approximation means 13, a text ordering facility 12 which operates in conjunction with a feature extractor 14 and a merger/segmenter 15 and a final classifier 16. The scanner can be any suitable commercially available device capable of producing a grey level image. One such device which can be used is a Hewlett-Packard HP9I90A scan-jet device. This device produces a 16 grey level image with a resolution of 300 pixels per inch. At this resolution each A4 page can be read in approximately 30 seconds and requires a storage capability in excess of 4 megabytes (Mbytes). This type of device makes use of a linear charge couple device array as the light sensing element and a typical grey level image for the letter "a" is shown in FIG. 2. FIG. 2A shows the image form and FIG. 2B the form of the image in hexadecimal values. In these values 0 represents black and F represents white, the values 1 to 9, A to E in between representing various levels of grey.

The edge extractor 11 operates by raster scanning the grey level image to locate edges. When an edge is found it is followed all the way around until a closed loop is formed thereby forming an outline of an object, e.g. character associated with the edge. If the edge does not form a closed loop it is ignored. A significant feature of the present optical character recognition arrangement is the use of a grey level image in conjunction with an edge extractor 11. The following are important advantages provided by this arrangement.

1. Looking for edges rather than black regions provides the ability to read any color of text on the background of any color provided that the contrast is sufficiently great. This is not possible by thresholding without manually selecting for positive or negative print.

2. In threshold type arrangements, when an image is thresholded non-text portions of the image form the same kind of black regions on a white-background as text. This causes the character cell location algorithm to be confused. With a grey level image, the vast majority of edges in the non-text region do not form closed loops and are therefore rejected. Any edges which do form closed loops will either not look like any known character, or will fail to form a reasonable text line. Hence grey level images provide discrimination between text and non-text.

3. Thresholded images have inadequate quality for use either in document storage or in new documents. Halftoning algorithms for scanning destroy text; therefore to obtain the text and images from a page in one scan, grey scale is essential.

4. Apart from a simple raster scan of the entire image from the scanner, the edge extractor examines only the edges of characters. The number of pixels in the image that are analyzed in detail is thus reduced by about 90%, thereby making it possible to process a page in a reasonable time. The output of the edge extractor is a long sequence of steps between neighboring pixels representing the outlines of the characters on a page which have been scanned. Prior to transmission to the text ordering facility this output from the edge extractor 11 is subjected to a polygonal approximation step in which the outline of the characters are approximated by sequences of straight line segments, i.e. polygons. There are two main reasons for approximating the outlines prior to passing them on to the next stage.

1. Both polygonal approximation and the processes used in feature extraction consume linear time with respect to the number of points on the input polygon. The constant of proportionality however is much larger in the case of feature extraction. Consequently, polygonal approximation results in considerable time saving.

2. It will become apparent that one of the most important features used in character recognition is the presence of concave regions in the outline. Polygonal approximation straightens out the zig-zags in the outline which would otherwise produce false concavities and confuse the recognition process.

An example of the polygonal approximation is shown in FIG. 3A and 3B. FIG. 3A represents the typical edge path of a character "a" and FIG. 3B is the equivalent outline after It has been subjected to polygonal approximation.

The output of the edge extractor 11 can be considered as a series of image blobs each of which represents the edge path of an object typically a character together with information on its bounding rectangle. This is the main input to the text ordering process 12, feature extractor 14, and merger segmenter 15. The function of the feature extractor 14 is to extract from the outline of the characters certain fundamental features. The particular features which have been selected for extraction by the present arrangement are as follows:

1. Concavities. In general terms a concavity is an area that can be filled and which may include some convex points. Three concavities are illustrated by circles 20 in FIG. 4.

2. Closure. A closure is a region of the background which is completely enclosed by the character. In FIG. 4 a closure is shown by circle 21. In certain fonts characters such as "p" and "e", are printed with an incomplete closure. It is the presence of functional closure rather than physical closure which is to be detected.

3. Lines. A line is a straight part of the outline. Line detection is complicated by the polygonal approximation since curves are converted into a small number of straight lines. They are thus rendered less distinct from actual straight lines.

4. Axes. An axis is sought for objects which have no concavity or closure. The axis feature measures the ratio of the lengths of the major and minor axes of a convex object. It is used to distinguish between characters such as a dot and a straight comma.

5. Symmetry. Symmetry is measured by comparing parts of the character on either side of an axis. Measurement of symmetry is difficult in the case of italicized text, where the axis of symmetry is not perpendicular to the direction of measurement.

In broad outline, using the features set out above, an unknown character is matched by the feature extractor 14 with a generic character class, i.e. it produces a class or set of ASCII characters which the blob could be. The mapping of generic character classes to ASCII characters is not one-to-one. A small number of characters appear in more than one fundamental shape, for example "g". Such characters must have more than one class which map to the same ASCII character.

A more common case is the single class which can map one of several characters. In certain fonts for instance, the characters "1" (one), "l" (lower case l) and "I" (capital I) are identical. The only way to distinguish them is by context. At the feature extraction stage there will be several generic classes to cover the various physical shapes of these three characters. Most of these classes will map to one of two or three ASCII characters, depending on the particular shape.

The main function of the text ordering process 12 is to identify the document structure and extract the correct ordering of the text within the document. The principal steps in text ordering are as follows:

A. Identify separate regions (blocks) within the document.

B. Classify the blocks into text or graphics.

C. Order text blocks into logical reading sequence.

D. Order text blocks into character order.

E. Deduce white space characters.

F. Associate parts of deliberately broken characters.

G. Identify potentially merged characters.

H. Resolve intrinsic character ambiguities (those which are a feature of the font) by geometry.

The merger segmenter 15 makes an attempt to merge the outlines of two or more blobs which have been identified as parts of an unintentionally broken character or to segment the outline of a blob which has been identified as the ligature of two or more characters. This process gives the system the capability of reading relatively poor copies such as that output from a photocopier.

The final classifier 16 makes the final decision as to the ASCII character associated with each blob by resolving any outstanding ambiguities, for example, the final classification can discriminate upper and lower case characters by using contextual information. It can also use context to resolve difficult ambiguities such as distinguishing between the number "1" a small letter "l" and a capital "I". The techniques available to the final classifier 16 include lexical rules (such as no numbers within words), Markov chain analysis and dictionary search.

The above is a general outline of the overall structure of the optical character recognition system. Certain elements of this overall structure will now be described in more detail.

Figure 5:
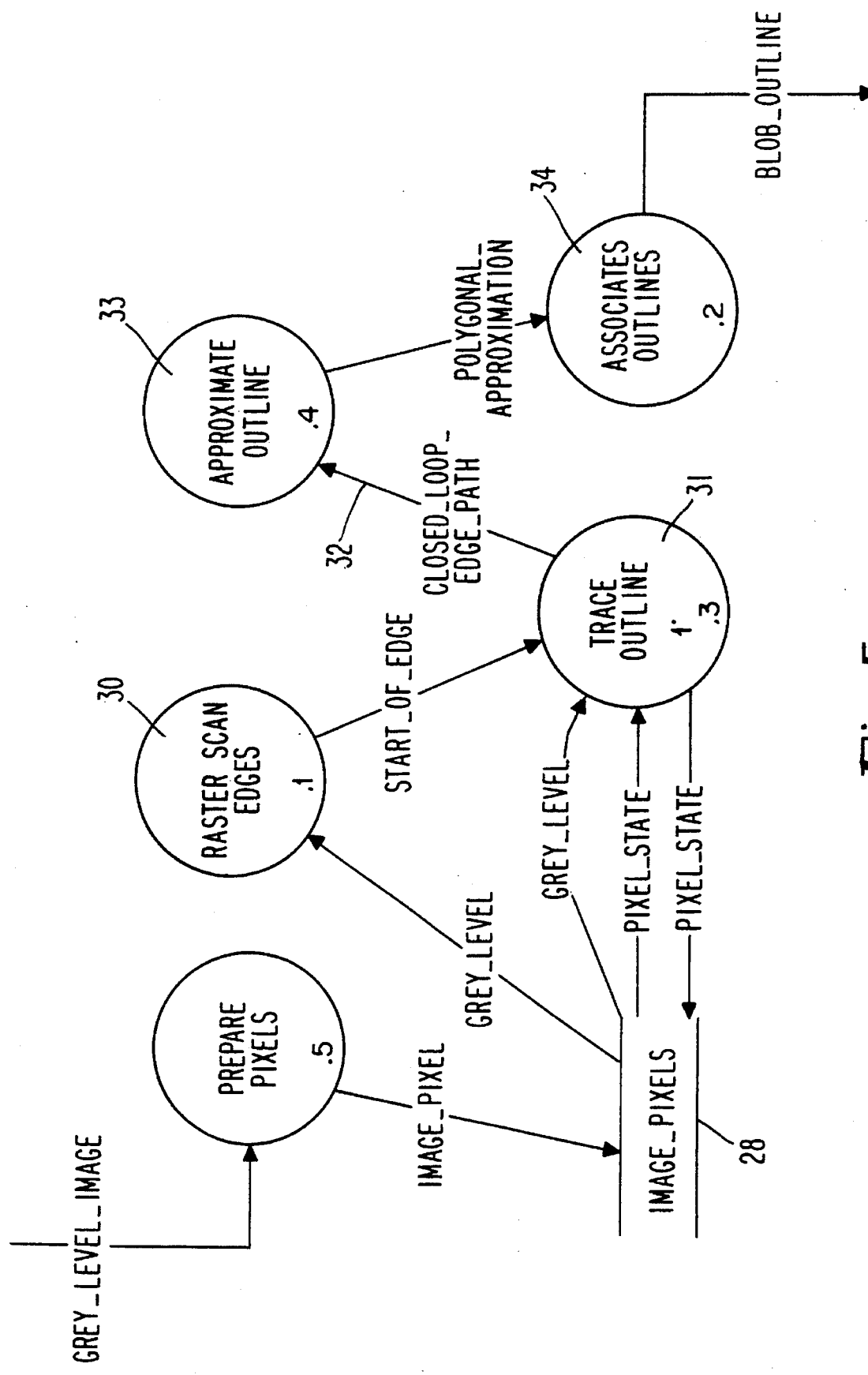
FIG. 5 is a block schematic diagram of an edge extractor which is used in the system of FIG. 1.

As has been explained earlier an important element in the present system is the edge extractor. The edge extractor is represented functionally in FIG. 5 of the drawings. The input to the edge extractor is a grey level image which comprises an array of pixels which are stored as shown at 28. This array is raster scanned as indicated at 30 to locate an edge, that is a significant difference in grey level between neighboring pixels. Once an edge is located the edge extractor operates to trace an outline as indicated at 31. The tracing continues until a closed loop edge path has been located as indicated at 32. This closed loop path is approximated as indicated at 33 to produce a polygonal approximation. The outlines are associated as indicated at 34 to produce a blob outline of an object which is fed to the text ordering process. The edge extractor 11 uses a novel edge operator to locate and follow edges around outlines until they form a closed loop. This operator is designed to find the edge strength perpendicular to the direction of travel between neighboring pixels. FIG. 6 illustrates the way in which the edge extractor 11 works. FIG. 6A shows a 3×3 array of pixels it being understood that this is a small part of the image of a document which has been scanned which will typically be 2,400×3,300 pixels. As has been indicated the edge extractor raster scans the image and "X" represents the current point on the scan. It will be seen that on FIG. 6A the chain code of each point in the neighborhood of "X" is given by a number in the box corresponding to that pixel. If "X" is the present position then the edge value at the next position with chain code "N" is the difference between the grey levels at points with chain codes (N+1) (modulo 8) and (N−1) (modulo 8). Thus referring to FIG. 6A the edge value at the point with chain code 0 is found by subtracting the grey level at 7 from the grey level at 1. This step is illustrated in FIG. 6B; FIG. 6C shows a similar representation of the operator for chain code 7. It should be noted that there is only a single operator for each direction and that the result is signed. An edge is indicated when there is an edge value greater than a specific threshold.

Once an edge is located an edge following algorithm comes into effect. The main process is to apply an edge operator corresponding to chain code 4 in a raster scan of the image. The raster scan thus locates the top edge of a new object which typically will be a character of text. When such a point is located with an edge value greater than a specific starting threshold and of either sign, the raster scan repeats a check one pixel lower in the image. When an edge is located there must be an edge of the same sign and strength greater than the starting threshold over a 2 by 2 cell-to ensure that the edge is significant. The light and dark grey levels from the strongest of these edges are used to determine a center value which is the average of the light and dark grey levels. On detection of an edge raster scanning is suspended and the line tracking process is started from the point with the higher edge value. The double check is provided to ensure that the edge is significant and that tracking starts at the strongest edge value. A region of grey values centered on the center value will be regarded during outline following as "grey", those above as "white" and those below as "black".

The tracking algorithm operates essentially as follows. Line tracking commences by tracking left from the starting point, i.e. from the point shown as chain code 4 on FIG. 6 and attempts to complete an anti-counter track of an outline. Given the chain code N of the last direction taken, edge values are found at each of the five points with chain codes N−2, N−1, N, N+1 and N+2 (modulo 8) from the current position. We define the five or less points which have the correct sign and are above the threshold, the edge set corresponding to this position and direction. From the edge set the point with the strongest edge value is found. The choice of the next point is non-trivial, but in most cases is the point with the strongest edge value.

This is illustrated in FIG. 7 of the drawings. In FIG. 7A there is shown a 5×5 array of pixels and the values in each square of the array represents the actual grey level values for part the character "a" which was illustrated in FIG. 2 of the drawings. Assuming that the current point is that circled, i.e. point 80 and the last move was in direction 4 in FIG. 6, then the edge values which would be calculated at the circle 80 are shown in FIG. 7B. The next step is to the rounded square 81 corresponding to edge value 13 shown in FIG. 7B. The edge values shown in FIG. 7C are those calculated at this square. FIG. 7D demonstrates how the calculated edge values change with the last chain code and represent the edge values at the diamond 82.

FIG. 7 shows that at each step there are several useful edge values. As long as the edge following process is in progress, points on the edge path are marked current to indicate that they form part of the outline being processed. If only one point is marked at each step the raster scan will later find unused points on the same edge and attempt to follow the outline again. Therefore as many points as possible (up to a limit of three) are marked subject to the following constraints:

A. The strongest edge is always marked.

B. All points to be marked must be in the edge set and have edge values over the tracking threshold.

C. All marked points must be adjacent.

Thus in FIG. 7 the points marked will be 13, 10 in FIG. 7B, 11, 12 in FIG. 7C, and 12 in FIG. 7D assuming a threshold of 4.

If at any time no points are found over the tracking threshold then the edge is considered to have faded, the object is discarded and the whole edge is remarked as deleted. The tracking process continues until the edge fades, a closed loop is completed, or the edge coincides with a previously completed outline. When an edge closes a satisfactory loop, all points on the loop are remarked used. The reason for changing all the marks when an edge is complete is to enable the discrimination between collisions with other lines and closing up the loop.

FIG. 7 also illustrates that there are instances when the next step is not an obvious choice. For example at the rounded square in FIG. 7C the highest edge values are 12 and 11. In many cases the choice has an insignificant impact on the result, although this is not necessarily always the case. The choice can have an effect in the following situations.

A. Line cross over: In some fonts lines are of variable width. At the thinnest part of the line it may be possible to follow an edge path across the line and thus incorrectly break-up the character.

B. Object merger: Some characters may be printed in very close juxtaposition. At the point when the two characters almost touch, there can be a two-way decision to be made when traversing either character. Both decisions must be correct otherwise the outline of one will collide with the other, resulting in the loss of one or both characters.

C. Fading: Where an edge is blurred it can be necessary to take a path corresponding to a weaker edge value in order to avoid the edge fading at a subsequent step.

The problems are exemplified in FIG. 8 of the drawings. FIG. 8A shows a portion of the character "a" which is illustrated in FIG. 2 of the drawings, particularly that part of the "a" at the point where the top of the loop meets the stem. The darkest pixels are shaded. FIG. 8B gives the edge values at the circled point 90, showing two points with an edge value 11. The edge sets from each of these points are shown in FIGS. 8C and 8D with the possible destinations indicated by a rounded square and a diamond in FIG. 8A. The rounded square is the correct path and the diamond is on the wrong side of the loop.

Problem B referred to above is illustrated in FIG. 9. FIG. 9A shows the correct outlines for a pair of closely spaced characters. The starting point for following each outline is marked with a +sign. In FIG. 9B a different choice was made while tracing the "t" resulting in a merging of the characters. The same path was followed in FIG. 9C, but with a different decision on the second path through the difficult region. The result is that the "i" is completed, but the edge did not close at the start of the loop and there fore both characters were lost. FIG. 9D shows the situation where the "t" was followed correctly, but the same route was taken for the "i" as in FIG. 90 so that it collided with the complete "t" and was deleted. A solution to this problem is to look ahead several steps to edge values beyond the current point to determine which path is to be selected.

Looking ahead also enables the detection of fading edges and those paths which will collide with a completed line. Alternative paths can be chosen in order to avoid problem C. A difficulty with this approach can be the amount of processing time consumed by searching a tree of possible paths to a reasonable depth.

There are many different algorithms for selecting the most appropriate edge path in a reasonable time and the following is a relatively simple example. It is based on the failure modes referred to above.

The algorithm for selecting between several alternative edge paths needs to be as fast as possible since there is some choice in almost every point on most outlines. The number of cases where the choice is vital however is only a fraction of the total.

The most important consideration is to avoid losing characters in the situations illustrated in FIG. 9C and 9D. Merging of characters is relatively insignificant.

FIG. 2 shows that there is a good dark line where the loop of the "a" meets the stem, but it is a single pixel wide. The problem characterized by FIG. 8 is due to a failing of the edge operator.

A successful method of choosing between edge points is to add an amount equal to the tracking threshold to the edge value if there is a transition from "white" to "grey" or "grey" to "black", at the edge point concerned. The value is doubled if the transition is directly between "white" and "black".

A candidate edge point must have a transition in the correct direction in order for it to be considered at all. An amount equal to the difference between the grey value at the edge point and the "center value" is subtracted from the edge value. The effect of this is to direct the edge path towards the same center value as was seen at the start of the edge, and to eliminate a large proportion of false edges, which are typically caused by thin lines.

The requirement of a reasonable level of look ahead (four steps) is inevitable to prevent edges fading and collisions of the type shown in FIG. 9. In order to save time however, the edge path algorithm looks ahead down the strongest edge path only. Alternatives are considered whenever the strongest edge path fades or collides with another edge. If an edge collides with itself away from the start of the line as shown in FIG. 9C the line is not discarded. The closed part is accepted and the rest of the line is continued after back tracking to a point where there is an alternative edge path. This approach can solve many of the path selection problems referred to above.

The "center value" used during edge extraction can be thought of as a threshold. An alternative version of the edge extractor evaluates the threshold by histogram analysis of the grey levels in a local area. This is a standard technique. (see Digital Picture Processing, A. Rosenfeld, A.C. Kak, 2nd ed. vol 2. p.70–71, Academic Press 1982). The threshold is obtained by calculating the weighted means of the dip between two peaks.

The variance of the distribution of grey levels in the dip between peaks is used to calculate the tracking threshold. This operation is applied over small squares in the image to compute local thresholds.

The calculated thresholds are used as the center value in the usual edge extraction process, with the exception that the raster scan uses the value as a simple threshold, rather than searching for a strong edge.

As will be apparent from the above all edge lines are detected and traced independently, yet some edges are related. Consider for example, the inside and outside edges of a letter "o". The edges are both part of the "o" and need to be related in the output structure in order for the features to be extracted correctly. It is necessary to record that the inner edge is enclosed entirely by the outer edge.

One way of dealing with this is by a nesting tree, but this is a complex process and the following is a simpler process.

Consider the minimal upright rectangular bounding box of a closed loop $C_1$. Let the coordinates of the bottom left hand corner of the box be (xmin1, ymin1). Similarly, let the coordinates of the top right hand corner of the box be (xmax$_1$, ymax$_1$ ) If the coordinates of the points on $C_1$ are given by ($x_i$, $y_i$), i=I,n. then:

xmin1=min($x_i$), xmax$_1$=max($x_i$) over i=1,n.

$ymin_1 = min(y_i)$, $ymax_1 = max(y_i)$ over $i=1, n$.

Clearly, given a second closed loop $C_2$, which lies entirely with $C_2$, the rectangular bounding box of $C_2$ lies within the bounding box of $C_1$, i.e. $xmin_1 < xmin_2$, $xmax_1 > xmax_2$, $ymin_1 < ymin_2$, and $ymax_1 > ymax_2$.

Given that only text is to be processed, the bounding boxes of all objects in the page are sorted using a 2-dimensional bucket sort. The bucket size is set to the minimum acceptable character size so that the number of buckets in a page is considerably less than the number of pixels. As each outline is completed, it is inserted into the relevant bucket, according to the top-left corner of the bounding box. When the page is completed, a simple linear search of the buckets is used to locate all completed outlines. For each outline, the small local area of buckets covered by the bounding box is searched. Any other outlines found which are enclosed are recovered and recorded as holes in the character.

The processing time consumed by this bucket sorting procedure is minimal, since the ratio of buckets to pixels is very small, (about 1 in 256 would be adequate) yet it guarantees to find the nesting relations for all characters in the ASCII character set. There is however, one character in the ASCII set for which the bucket sort can produce incorrect results. It is possible, although highly unlikely, for the percent symbol % to be printed such that the circles appear to be enclosed by the stroke.

The situation is illustrated in FIG. 11a. Since this is a single exception, there is a simple solution. If the (x,y) space is transformed to the (x+y, x−y) space, and bounding boxes are also calculated for the rotated space, then testing the enclosure condition for both spaces ensures a correct result. The result of this simple rotation transformation is illustrated in FIG. 11b.

Although the sole objective of the bucket sort is to obtain the nesting information of characters with holes such as 0 there is a side effect in that for a wide range of page layouts, the operation provides a successful sort of the characters into logical text order.

Figure 13:
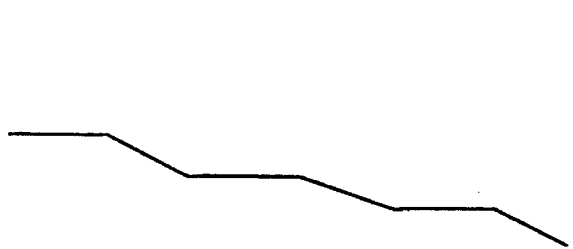
FIGS. 13 and 14 illustrate the operation of the polygonal approximation facility.

The output of the edge extractor 11 can be considered as an outline comprising a series of points connected by straight lines. The lines on either side of a point will either extend at 90° to each other, 45° to each other or be collinear. The polygonal extraction process is essentially a two-stage process. In a first stage it identifies fixed points, e.g. the point at a 90° bend and identifies segments made up of two directions as shown in FIG. 13.

Figure 14:
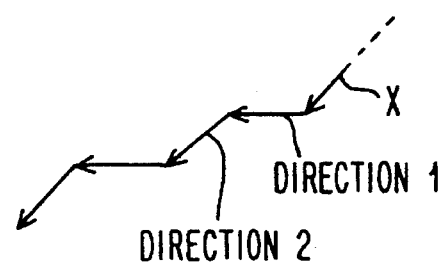

The process starts by locating either a right angle bend or a point which is the first of two 45° bends in the same direction or sense. If the bend at the next point is 45° the process looks forward until it finds the end of the segment. It also adds up the total length for each direction making up that segment. If the line from the start point is direction 1 (see FIG. 14) and the line from the point after the start point is direction 2 then if direction X equals direction 2 and if the length of X is greater than length 1 or the sum of all direction 2's in a segment is greater than the sum of all direction 1's the start point is moved back to point X. The next point is marked as a fixed point.

At the end of the segment, that is to say at a point from which the next direction is not direction 1 or 2 (FIG. 14), the process moves back one point from the end of the segment and if the previous point is a start point the new end point is fixed. Otherwise if the end bend is 90° or the length of the last segment is greater than the length of the penultimate segment or the sum of the total lengths in one direction is greater than the sum of the total length from the other direction then the end point is fixed as the very end point. Otherwise the end point is one point short of the end.

This process continues around the loop until the original start point is reached. This represents the first stage of the polygonal approximation. Before proceeding to the second stage the process identifies if there are two adjacent points which have been marked fixed and where the step in between these points has a length value 1 and the points on either side of that length not being fixed. If this situation is identified then those two fixed points are deemed to be not fixed.

In stage 2 the process proceeds around the loop initially calculating correction values for a later calculation. This is carried out on the original loop output from the edge extractor. The process counts the number of marked points on either side of a main path for each section. It then takes the difference of counts, scales it and divides it by the number of steps. This is a correction value. The process then looks for a fixed point followed by a non-fixed point. If it cannot find any fixed point (which is unlikely) then it will arbitrarily choose one. Starting from the first located fixed point the process then identifies the next fixed point and a function approximates between fixed points. This is repeated for the remaining fixed points.

The process calculates the perpendicular distance of each intermediate point between adjacent fixed points from a point on a line joining the two fixed points. In carrying out this process it uses the correction value referred to earlier. The process sums the squares of the perpendicular distances to find the mean square deviation and the maximum perpendicular distance from the line joining the fixed points. The maximum and mean square deviations are compared against the longest side of the rectangular bounding box of the outline. If either exceeds a limit the two fixed points are not joined. It then recurses so that the fixed point is moved back to the point with the maximum perpendicular distance and the process is repeated until a point is found which meets the necessary criterion. The process proceeds through the loop repeating these calculations and joining up fixed points which meet the criterion to produce the polygonally approximated outline. This data is then fed to the feature extraction and merging and segmentation stage.

After edge extraction and polygonal approximation the next process is text ordering in conjunction with feature extraction and merging and segmentation. The main input to the text ordering stage 12 is a set of blob outlines and their bounding rectangles. It is significant to note that this is a different starting point to some other image segmentation systems. A functional illustration of the operation of the text ordering stage is given in FIG. 12 of the drawings. As shown, the first step in the process is to partition the document as illustrated at 100. Blob outlines are fed for feature extraction 101 and identified blocks to a block store 102. There is an identify block type facility 103 following which the blobs are associated into rows as illustrated at 105. Finally the classified blob outlines are subjected to character selection 106. The output from this facility represents the character options for each of the blobs received from the edge extractor. Before describing the text ordering stage in more detail, the way in which features are extracted in the feature extraction facility 14 will be described. This facility extracts features from the outline polygons output from the edge extractor. Consideration of prior art arrangements shows that there are many character attributes which can be used in the processing of character outlines. For the present arrangement we have selected a set of 5 functional attributes which are set out as follows in order of decreasing importance for character recognition:

1. Concavity. Concavity is defined as any concave part of an outline. This includes concavities known as bay, inlet, notch and hook together with small concavities which result from crossing, weld and marker.

2. Closure. By this is intended to mean functional closure as defined, for example, by Shillman R. in his phD thesis 1974, entitled "Character Recognition Based on Phenomenological Attributes: Theory and Methods", a paper in International Journal of Man-Machine Studies Vol. 6, No. 6, P.701–714.

3. Line. A line is a straight part of the outline which results from a shaft, arm or leg.

4. Axis. An axis is defined only for characters which do not have concavity or a closure. The axis indicates the direction of the major axis of the object and measures the ratio of the length of the major and minor axes. It can be used to resolve ambiguities within the ASCII character set which are not covered by Shillman's attributes. An example is the resolution of an ambiguity between a dot and a straight quote or comma.

5. Symmetry. Symmetry can be measured in either a vertical or a horizontal axis.

The following is a description of how the features referred to above are extracted from the polygonal outline approximation supplied by the edge extractor and the way in which each is numerically represented. Before describing the extraction of each feature in detail, the concise notation for the points and vectors on the outline is set out below.

The object to be recognized consists of one or more closed loops, formed by a total of n points with integer coordinates. If the n points are connected in sequence by straight line segments, and the last point is joined back to the first, then a left oriented closed loop is formed; i.e. the interior of the character is always on the left when moving from a point to its successor. Thus, the outside loop is stored in anticlockwise sequence and holes are stored in clockwise sequence.

$P_i$ is the coordinate pair ($x_i$, $y_i$) of the ith point.

$P_i+1$ represents the coordinate of the successor point to $P_i$. Note that this is the next point around the closed loop containing $P_i$ and not necessarily the (i+1)th point.

$P_i-1$ similarly is the predecessor point to $P_i$.

$P_iP_j$ is a vector from the point $P_j$ to the point $P_i$.

$P_i$ and $P_j$ may be on different closed loops.

$P_{i+}$ is an abbreviation for $P_iP_{i+1}$.

$P_{i-}$ is an abbreviation for $P_iP_{i-1}$.

$a \cdot b = a_xb_x + a_yb_y$ is a scalar product of two vectors.

$a \times b = a_xb_y - a_yb_x$ is a cross product of two vectors. The result is a scalar value.

$P_i$ is convex if $P_{i+} \times P_{i-} >= 0$, otherwise it is concave.

$|P_iP_j|^2 = P_iP_j \cdot P_iP_j = (x_j-x_i)^2 + (Y_j-Y_i)^2$ is the squared Euclidean length of the vector $P_iP_j$, i.e. the distance between $P_i$ and $P_j$. In this specification, the terms distance$^2$, length$^2$ etc will refer to this measure $|P_iP_j|$ is the square root of $|P_iP_j|^2$.

A concavity is a part of the outline which does not lie on the convex hull of the outline points. For each set of points which do not lie on the convex hull of the outline, one or more concavities is generated.

A concavity is split if it contains a convex point which is a local minimum in terms of perpendicular distance away from the hull line. (the hull line is the part of the convex hull with which the outline is not coincident). The depth of the concavity on either side of the minimum must be a significant fraction of the depth to the minimum point for the split to take place.

Figure 15A:
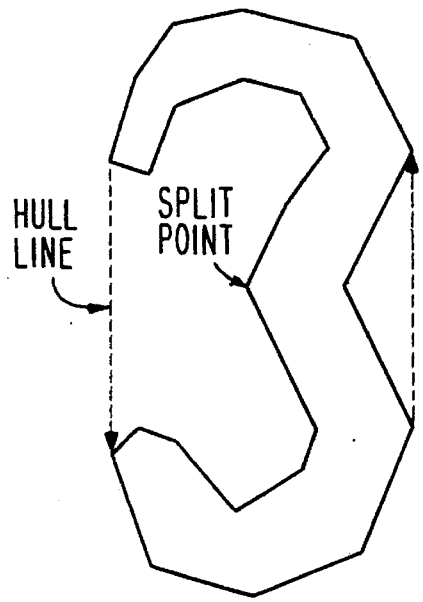

In the case of a split, the two parts are treated exactly as if they were ordinary concavities, except that the direction will be that of the original hull line. FIG. 15(a) shows a concavity with a split.

A concavity may also form a closure if the width of the narrowest part is extremely small when compared with the width of the widest part.

Once the concavity has been identified to contain no more splits, if it has a local minimum width less than half way in, the ends are moved in to the narrowest point. See FIG. 15(b).

Figure 15B:
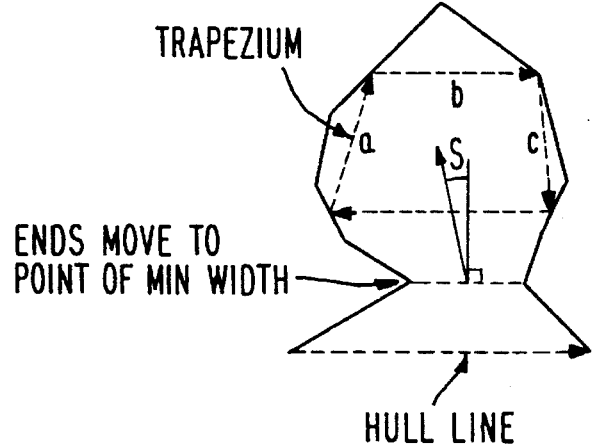

A trapezium is then formed by drawing lines, parallel to the hull line, across the concavity at ¼ and ¾ of its depth. FIG.15(b) shows the trapezium. The trapezium is used to generate several of the numerical components of a concavity:

(a) The direction of a concavity is the direction of the hull line (when it was first located) quantized to the range [0,63].

(b) The position of the centroid of the concavity after the ends were moved in the narrowest part. The coordinates are normalized independently to the range [0,63] relative to the minimal upright rectangular bounding box of the outline, so that (63,63) represents the top right corner of the bounding box.

(c) The shape of the concavity is given by:

$$\frac{64\,axc}{axb + bxc},$$

where a, b, c are as shown in FIG. 15(b). The result is clipped to [0,63]. This gives a measure of angle between the sides of the trapezium.

(d) The depth of the concavity is given by the perpendicular depth of the trapezium divided by the length of the base. (The line nearest the hull line). The result is multiplied by 32 and clipped to [0,63].

(e) The skew of a concavity is given by the angle between the line drawn from the center of the line across the end of the concavity, to the centroid of the concavity, and the line perpendicular to the line across the ends of the concavity. This angle is marked 5 on FIG. 15(b). The angle is quantized to the range [0,63] by mapping 0 to 32, $-\pi$ to 0 and $\pi$ to 63.

(f) The area of the concavity as a fraction of the area of the convex hull, scaled to the range [0,63].

Figure 16A:
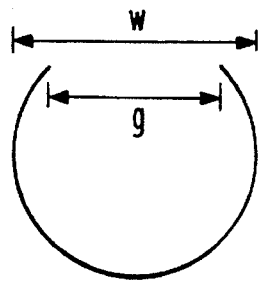

Turning now to closures, a closure is generated for each physical closure. As each concavity is generated, it is tested for functional closure. A known functional closure definition can be seen by reference to FIG. 16. For circular characters with a gap at the top, as in FIG. 16(a) the rule is given by:

The gap is functionally closed if g/w<0.56

Figure 16B:
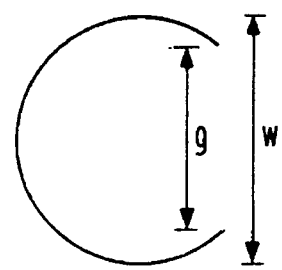

If the ambiguity is between "O" and "C" i.e. the gap is centered at the right, as in FIG. 16(b) the rule becomes:

The gap is functionally closed if g/w<0.23.

The test depends on the direction. For a right-facing concavity, experimentation has revealed that the threshold value given above is too large. In order to prevent certain occurrences of "G" from being functionally closed, the threshold has been reduced from g/w=0.23 to g/w 0.17, where g=$|P_iP_j|$, and w is the maximum width of the concavity in the same direction as $P_iP_j$.

Different values are used for other directions. For a downward or left facing concavity, the threshold is currently set at 0.29. For an upward facing concavity, the threshold is set at 0.38. For all directions, an additional constraint is added:

$$\frac{gd^2}{wA} < 0.45,$$

where d is the depth of the concavity as described above, and A is the area of the concavity. This constraint effectively reduces the g/w threshold for deep concavities, making it less likely that characters such as "e" are closed.

The following values form the numerical representation of a closure:

(a) The normalized relative coordinates of the centroid of the closed region. The calculation of the coordinates of the centroid is identical to the method used for concavities and is described below.

(b) The scaled area of the closure as a fraction of the area of the rectangular bounding box of the character. The fraction is scaled to the usual [0,63] range.

The axis feature is generated only if the character has no concavity or closure. Rather than perform a squared order calculation to find the greatest distance between any pair of outline points, a linear algorithm is used.

First, the centroid C of the object is calculated. The point $P_i$ on the outline is found such that $|P_iC|^2$ is a maximum. The maximum perpendicular distance of any point on the outline from the line $P_iC$ is calculated independently for each side of the line. The results are summed to give the width of the object. FIG. 17(a) illustrates how the width of the object is calculated. The direction of the major axis of the object is given by the vector $P_iC$ unless a smaller width result is obtained by moving $P_i$ to the midpoint of $P_{i+}$ or the midpoint of $P_{i-}$. Moving $P_i$ to one of the adjacent midpoints provides an adjustment of the direction in the case of the object in FIG. 17(b), where the new position of $P_i$ is shown as $P_i'$.

Having established the direction of the major axis, the length is obtained by applying the same width calculation to a vector perpendicular to $P_iC$. The numerical representation of an axis consists of the following items:

(a) The ratio of the width of the object to the length of the major axis.

(b) The direction of the major axis is quantized to the [0,63] range. Unlike the other features which include a direction, the axis has no sense. Therefore it may differ by 32 units (modulo 64) from another in the same direction.

The direction is clearly meaningless when the width to length ratio is high, (i.e. close to 1,) since a dot, for instance, can have no direction.

Lines are used only when an unknown character closely matches two of the standard templates, as measured with concavities, closures and axes. In the detection of lines there is a trade-off between reliably locating all useful lines and finding false lines in approximations to curves.

A line is defined to consist of one or more segments of the polygonal approximation which satisfy a minimum length condition. If the line consists of more than one segment, the maximum perpendicular deviation of any point along the line, from the straight line joining the ends, must be below a certain limit.

The conditions serve to reject lines which are part of a curve. FIG. 18(a) illustrates some examples of possible lines which do not meet all the criteria. The bold parts of the outline in FIG. 18(b) indicate accepted lines. A line is identified by the following numerical values:

(a) The normalized relative position of the center of the line.

(b) The quantized direction of the line.

(c) The scaled length of the line as a fraction of the maximum size of the rectangular bounding box.

Symmetry is a useful measure, for discrimination of the following pairs of characters: C/G, j/), j/], T/1, ]/7, B/8, O/D. The main difficulty is to locate the axis of symmetry. For vertical text, the axis is simply a vertical line through the center of the upright bounding box of the character. For italic text however, the axis is rotated slightly and the exact position is difficult to locate, especially with characters such as "0".

The axis of symmetry is calculated by two methods. If the first fails to produce a result, the second method is used. The second method will always produce some result.

(a) The first method searches the outline for a vector which passes from the bottom half to the top half of the bounding box. If the vector can be extended around the outline to span half the height of the bounding box, equally about the center, without going through a significant change in direction, then the summed vector is added to the result.

If any such vectors are found, then their sum gives the direction of the axis of symmetry. This method is successful for round characters, such as "0" and "e", and for characters containing vertical lines, such as "H", "p" etc. It does not produce a result for angular characters such as "X" or "8".

(b) The second method finds the rightmost point on the outline, and finds the most clockwise line which can be drawn through this point, without intersecting any other part of the outline. The same operation is performed with the leftmost point on the outline. The line which was least clockwise from vertical becomes the axis of symmetry.

Both vertical and horizontal symmetry can be used in the recognition process. Vertical symmetry is measured by consideration of each point $P_i$ on the outline. If the axis is not vertical, the coordinates of $P_i$ are transformed back from the sheared coordinates to rectangular coordinates. The square of the least distance between the reflection of $P_i$ in the axis and the transformed outline is measured. A measure of the vertical symmetry is given by the maximum such distance for all points on the outline.

Horizontal symmetry is measured similarly using a horizontal axis. The same transformed outline as was constructed for measurement of vertical symmetry is used. FIG. 19(a) illustrates the outermost outline of an italic "B". In FIG. 19(b), the outline has been inverse sheared back to the vertical, and the reflected points are shown as joined by dotted lines. Some of the "+" marks are clearly a significant distance from any part of the solid outline.

Symmetry is tested by commencing at a point where the axis intersects the outline and working in opposite directions simultaneously. If the object is to be at all symmetric, then the point nearest a reflected point must be in the locality of the current point on the opposite side of the object.

Measurement of symmetry is applied only in the case of an unknown character matching a particular pair of templates. Only a single direction will be measured in most cases, according to the pair in question. The result is a distance which is squared and must be scaled to a fraction of some measure of the size of the object, for instance, the area of the rectangular bounding box.

A second measure of symmetry is calculated by computing a vector from the center of the de-sheared bounding box, to the centroid of the de-sheared outline.

The numerical representation of this symmetry measure is composed of the individual components of the vector as a fraction of the size of the de-sheared bounding box, multiplied by 128 and clipped to [−32,31].

The following illustrates the calculation of area and centroid.

Figure 20:
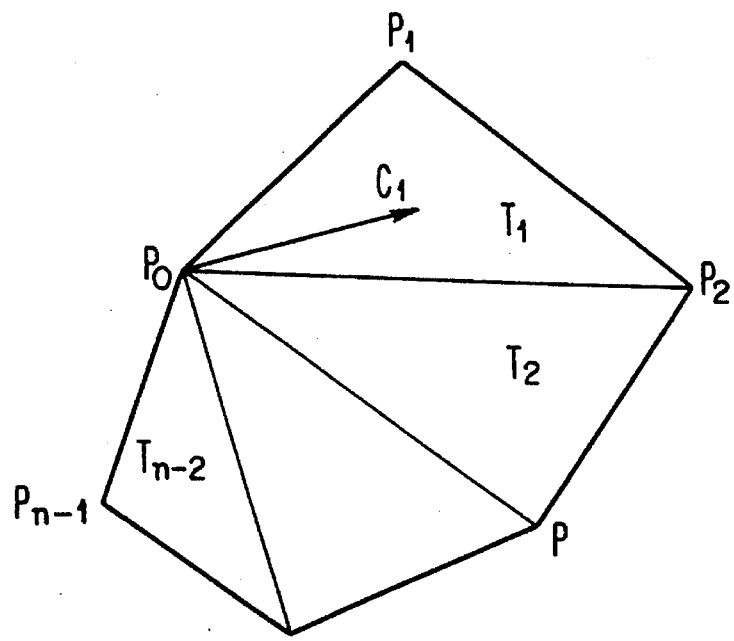

A simple procedure is used to simultaneously calculate the area and centroid of a closed region. In FIG. 20, there is a closed region bounded by a polygonal approximation of n points, $P_0, P_1, P_{n-1}$. The closed region is divided into n−2 triangles, $T_1, T_2, \ldots T_{n-2}$. Let the triangle $T_i$ be bounded by the points $P_0 P_i P_{i-1}$.

Then the area of $A_1$ of triangle $T_i$ is given by:

$$A_1 = (P_0 P_{i-1} \times P_0 P_i)/2$$

Let the vector From P to the centroid of $T_i$ be $c_i$. Then $c_i = (P_0 P_i + P_0 P_{i+1})/3$.

The vector from $P_0$ to the centroid of the entire region is given by:

$$\frac{\sum_{i=1}^{n-2} A_i c_i}{\sum_{i=1}^{n-2} A_i}$$

It can be shown that the above formulae for the total area and centroid are not affected by the object being concave, since the cross product yields negative results where necessary.

The different types of features described above are regarded as being totally separate and therefore adjacency relations between a concavity and a line, for instance, are not recorded. This separation simplifies the recognition process and has been experimentally determined to actually improve recognition accuracy. There are two reasons by complex adjacency information reduces rather than increases the recognition rate:

(a) Simple positional information is adequate for uniqueness in the ASCII character set. As an example, it is difficult to construct an outline which contains a closure at the top, a downwards facing concavity at the bottom and oblique strokes at the right and left without producing an "A". Removal of the adjacency information therefore does not reduce accuracy.

(b) A line may be located within a concavity. Occasionally, one end of the line may extend beyond the limits of the concavity, thus changing the apparent ordering of the features. Using the adjacency information can therefore reduce accuracy.

Multiple occurrences of the same type of feature however, are ordered, since this also simplifies comparison. The features of each individual type are recorded in the order in which they are located on the outline. This necessitates a reliable definition of origin.

An obvious solution is to maximize a function of the coordinates of a point taken over all the outline. The function must be reasonably simple to calculate, and yet the contours must be such that no character has two distant points on the maximum contour. As a simple example, consider the function f(x,y)=y−x, which selects the top left corner of the object. The character "+" however, has two distant points which lie on the maximal contour of f (x,y). Slight variations in size or aspect ratio may result in a dramatic shift in the location of the origin, which would cause different representations of the same character.

Figures 21A, 21B:
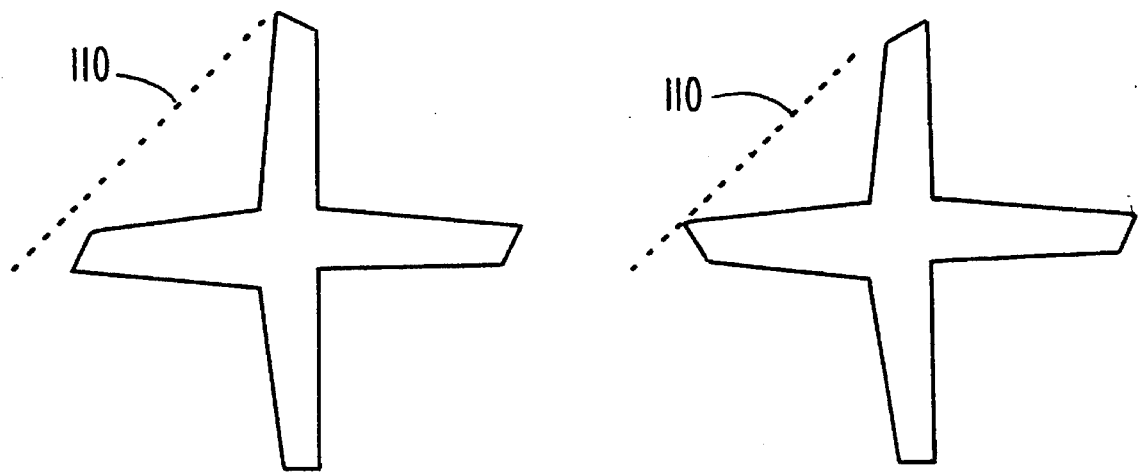

The problem is exemplified by FIG. 21. The dotted line 110 indicates the maximum value of f(x,y)=y,x in each case. The "+" in FIG. 21(a) has its origin at the top, whereas the in FIG. 21(b) has its origin at the left. The present function for selecting the origin is f(x,y)=4y−x. This function was chosen to allow a reasonable skew of the page, while selecting a reliable point on every ASCII character with the possible exception of "*".

Figure 22:
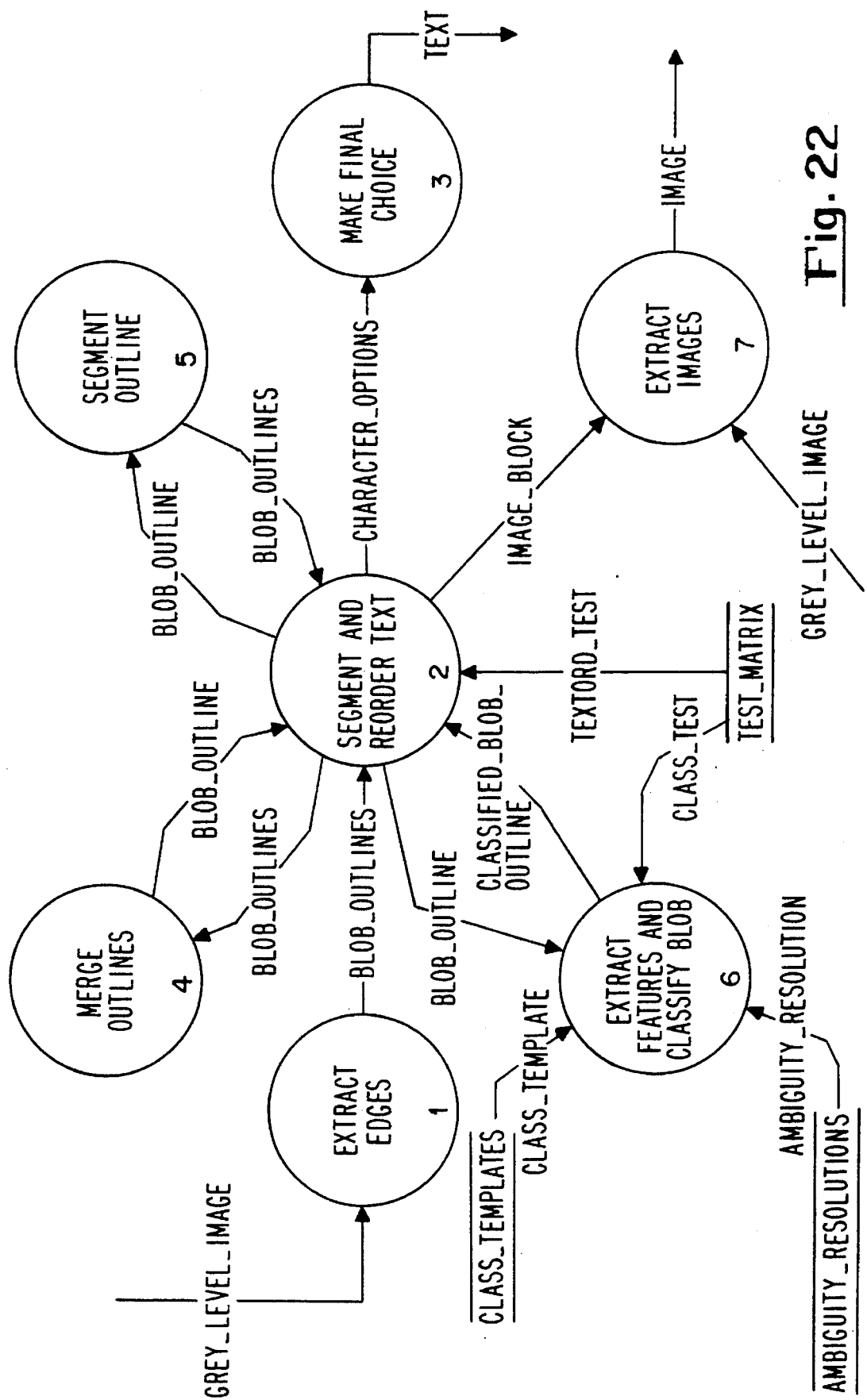
FIG. 22 is a block schematic diagram of the feature extraction, text ordering and segmentation, and final classification part of the system of FIG. 1.

As can be seen from the functional representation given in FIG. 22 the system requires a set of standard templates with which to compare an unknown character. The most appropriate way to generate the templates is by analysis of samples covering a wide range of fonts. It is intended that the completed system will recognize a very wide range of printed fonts without any training or intervention from the user. The learning process must therefore, provide a sufficiently wide range of fonts such that no further training is required.

The learning process involves generating the features for a set of character outlines with known ASCII codes. Several samples of each character in as wide a range of fonts as possible must be supplied, so as to learn the expected variation in the numerical representation of each feature.

The result of the learning process is a set of character classes. A character class represents a set of one or more characters which have an indistinguishable set of features. An example of a pair of characters which occupy the same class is C/c, where the only difference is one of size relative to neighboring characters.

Conversely, one ASCII character may appear in several different guises, such as a/a. A more subtle variation occurs in punctuation marks. The comma, which appears as the same shape in a semi-colon, quote and double quote, has two fundamentally different shapes: straight as in ' and curly as in •. Two different classes will result, each of which contains all the aforenamed characters.

In order to construct the standard templates automatically, it is necessary to detect the differences between two versions of the same character, and similarities between different characters. The process therefore includes the following steps:

(a) Clustering. All the similar features from different samples of the same character are grouped together into clusters. The extreme feature values within each cluster give the limits on the acceptance range. The number of samples which contribute to a cluster indicates the importance of the corresponding feature in recognition.

(b) Partitioning of classes. Those classes which do not have a minimum number of consistent features, i.e. those for which a cluster is generated by all samples, are partitioned.

(c) Merging of ambiguities. Ambiguous classes are merged where there is some physical distinction between the characters which can be used at a later stage to distinguish them.

Figure 24:
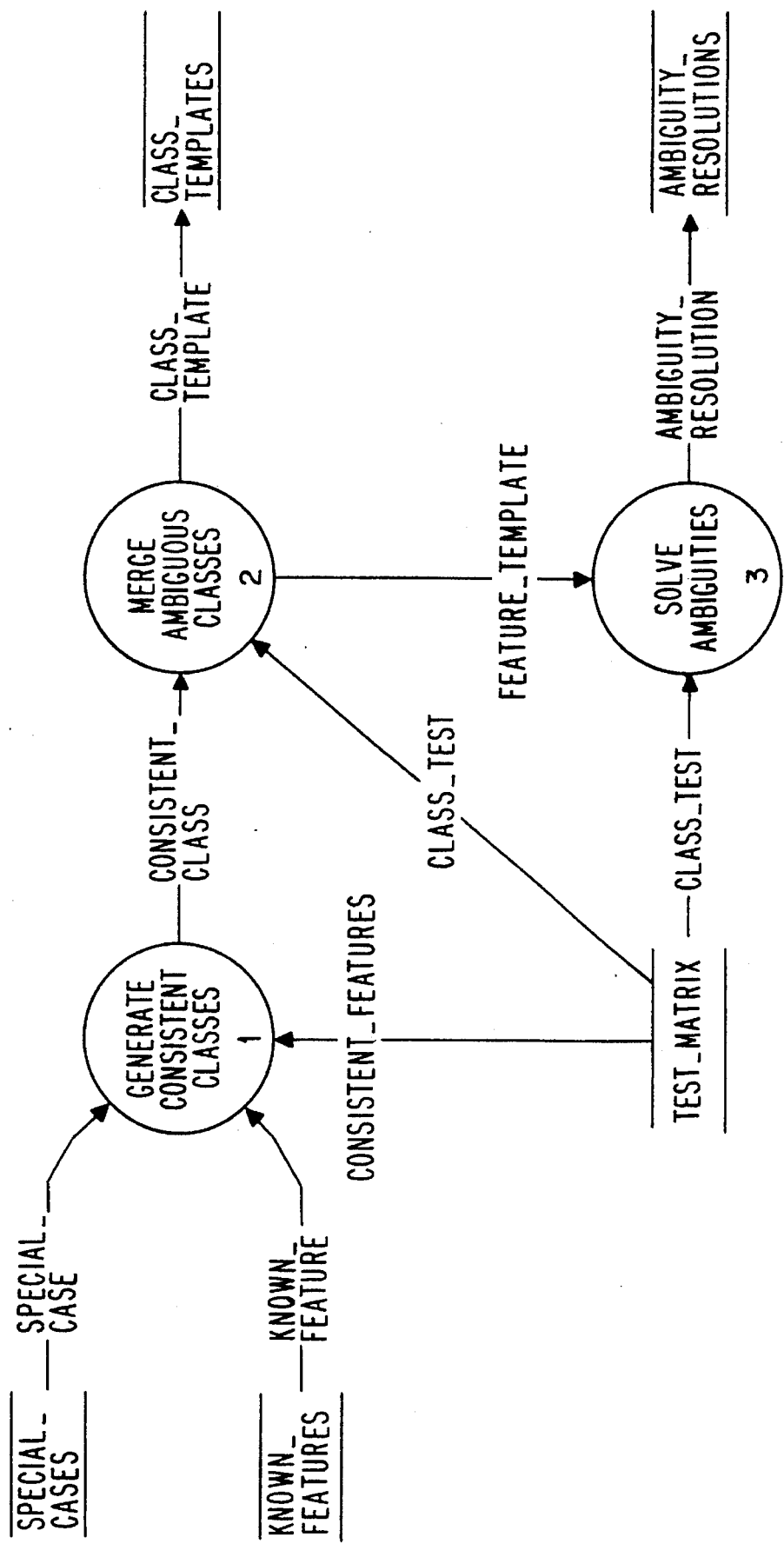
FIG. 24 is a functional representation of the template generation facility.

A functional representation of the generation of templates is given in FIG. 24.

A standard clustering algorithm can be used to detect similar features in different samples of the same character. The nature of the data however, simplifies the clustering problem.

A sample character may have several features of the same type, each of which must lie in a separate cluster. If most samples of the same character contain largely the same features, as is the case if the class is not to be partitioned, then it is reasonably simple to match corresponding features and create new clusters for those which do not match.

The clustering algorithm copies the first sample character to the standard template. Each subsequent sample of the same character is compared with the standard template using a flexible matching algorithm. In the comparison, only the most important numerical values are considered, for instance the position and direction of a concavity. A much greater tolerance of error is also included. For features which match a feature in the standard template, the acceptance limits are expanded. Those features which do not have a match in the standard template are inserted in the relevant position, using the order from the origin.

FIG. 25(a) shows an example of the first sample of a letter "H". The square indicates the limits of the standard [0,63] range on the (x,y) coordinates of the centroid of the concavities. The marks indicate the positions of the two concavities in the first sample. FIG. 25(b) shows the final template for the concavities after a total of 7 samples have been analyzed. The clusters on the left and right of the square are caused by serifs on the top and bottom of the "H". A dotted "H" is superimposed on FIG. 25(b) to show the relation between the character and the concavities.

A consistent feature is one which exists in all the sample characters which were used to construct a template. When all the samples of a character have been read and compacted by the clustering algorithm, a count is made of the consistent features. If the number is below a set limit, the class is partitioned. The limit is set individually for each character in a database.

Partitioning is based on the modal feature. All samples which possess the modal feature are placed in one partition, and the remainder go in another. If the minimum number of consistent features for the character is two, then only those samples which possesses the two most common features are placed in the first partition.

If the second partition does not contain the required number of consistent features, then that is sub-divided until all partitions satisfy the minimum consistent feature criterion. A partition can fail to satisfy the minimum consistent feature criterion if it contains a sample with less features than the minimum. There must clearly be an exception to the rule, to allow a partition to contain too few consistent features if there is no feature which is not consistent.

The less ambiguity that exists between the final templates, the higher the accuracy of the final classification. In order to obtain a low ambiguity level, it is inevitable that some classes must contain more than one ASCII character. Merging is acceptable only if the characters can be distinguished by some physical measure which is unavailable at the feature extraction stage. Examples of such measurements are:

(a) Relative height. Used to distinguish capital and lower case letters.

(b) Position on the text line. Pairs such as $/$ and $-/_{13}$ can only be discriminated by position on the line.

(c) Neighboring marks The set {!, ", %, =, ;, :, ?, i, j} are all distinguished from other characters by the presence of neighboring marks. These characters result in several classes, each containing a different set of characters.

(d) Context. Certain characters appear identical in some fonts. The usual problem sets are (O, 0) and (1, l, I). The only guaranteed way to determine the correct character is by context. The classes can therefore be merged. Certain other pairs such as {S, 5} are difficult but not impossible to distinguish. Context will be helpful in making the correct decision in these cases, but it is not acceptable to merge the classes.

In order to automatically merge the correct characters into a reasonable set of standard templates, use is made of a knowledge base. The knowledge base consists of a list of characters which may be merged with each character in the character set.

When the final classes have been determined, a weight is assigned to each feature within each class. The weight determines the matching error which will be generated if the feature is absent in an unknown character.

The ideal way to generate the weights would be to try all reasonable combinations of values to minimize the ambiguity across the entire character set. This is obviously impractical, due to the enormous number of combinations of reasonable values. It would be possible however, to use an iterative evolutionary process to refine the weights randomly and maximize the distance between different classes. Such a process would identify those features which are important in distinguishing almost ambiguous characters, such as the closure in the pair {*,#}.

The present algorithm for assigning weights to features is simple but effective. For consistent features, the weight is inversely proportional to the number of consistent features in the class. A "C" therefore, with a single consistent feature, will have a high weight for the concavity. Conversely, "#" will have a low weight for each feature, since loss of any one, apart from the closure, is relatively insignificant and common. Features which occur in more than 75% of the samples have weights assigned similarly, but with a lower constant of proportionality. All remaining features are considered embellishments and are assigned zero weight.

Once the features have been extracted from an unknown character, an attempt is made to match the features against one of the standard class templates. One of the most important aspects of the recognition process is that it must be flexible. Different fonts cause variations in the features that are detected. It must be possible therefore to recognize a character which has one or two additional features or missing features.

Simultaneously, it is desirable to test the unknown character against as few templates as possible, in order to increase the recognition speed. Speed and flexibility are, to some extent, mutually exclusive.

Flexible comparison is carried out as follows. Each individual type of feature is considered separately. For each type however, the features are ordered in the sequence in which they occur from the origin. The comparison task therefore is to match two ordered lists, each of which may contain elements which do not occur in the other. FIG. 26 illustrates the result of the flexible matching process. A list of test features $<T_1, T_2, T_3, T_4>$ is to be matched against the list of standard features $<S_1, S_2, S_3, S_4>$. Arrows indicate matches between individual features.

A match error is generated for the entire list, which is the sum of individual match errors between the features connected by arrows, and errors generated for the missing and additional features.

A direct comparison between two single features involves testing all the elements of the numerical representation of the feature. Consider for example, a closure. Let the limits on the x-coordinate of the centroid of the closure be Xmin and Xmax. If the x-coordinate of the centroid of the closure in the test feature is X, then a match error, e, is generated as follows:

e=|X−{Xmin+Xmax}/2| If xmin <=X Xmax,

W (Xmin−X) If Xmin−d<X<Xmin

W (X−Xmax) If Xmax<X<Xmax+d,

Wd If X>=Xmax+d or X<=Xmin−d.

where d is a maximum allowed deviation from the acceptance range, and W is a weight. W is derived from $X_{max}-X_{min}$ and $M_{max}$.

The match errors for all the elements of the feature are summed, with weights on each element. If the total is greater than $M_{max}$, it is set to $M_{max}$. This ensures that all failed matches have the same value, whatever the type of the feature. Let the match error between a test feature $T_i$ and a standard feature $S_i$ be denoted by $M(T_i,S_i)$.

With this approach, values which are well outside the acceptance range produce a fixed maximum error, rather than an infinite error. The fixed maximum provides flexibility by still allowing a match when small parts of a limited number of features are out of range.

If the value is within the acceptance range, then a small match error is generated, rather than zero, indicating the distance from the center of the range. This small error is to provide some difference between intrinsically ambiguous characters such as "u" and "v" where otherwise a character may have a match error of zero for both classes.

A recursive procedure finds the best match between two ordered lists of features by performing a depth-first search of the tree of all possible ordered matches. The first operation is illustrated in FIG. 27. If:

$$M(T_1,S_1)<M_{max},$$

then the match rating for the entire string is equal to $M(T_1,S_1)$ plus the best match rating for the remainder of the lists, generated by recursion. The first test feature is then matched against each of the remaining standard features in turn, summing the errors for each skipped standard feature. This process is illustrated at the second level of recursion by FIG. 27(b) where $S_2$ has been skipped and $T_2$ is matched against $S_3$, and in FIG. 27(c) where both $S_2$ and $S_3$ have been skipped. The error generated for skipping $S_2$ governed by its weight. Note that recursion only occurs when there is a match less than $M_{max}$.

The final operation is to assume that the first test feature is an extra feature. This is skipped, generating a fixed level of error, and recursion is used to evaluate the match rating of the rest of the list. FIG. 27(d) illustrates skipping the first test feature at the third level of recursion.

The match rating for the list is defined to be the lowest result obtained from the depth-first search. An obvious reduction in match time is obtained by truncating the search where the accumulated error exceeds the lowest full depth error so far.

The algorithm for matching an unknown character against a standard template is described above. Testing each character against the entire set of templates would guarantee that all possible matches are detected. The time involved however, is unacceptably great. It is therefore necessary to reduce the number of standard templates tested, while ensuring that the correct match will be obtained.

The method adopted is to use a look-up table to select a small subset of the full character set. Each feature of a test character is used to locate those standard classes which include the same features.

For every possible x-coordinate in the usual [0,63] range, a bit array is constructed, with one bit per character class. The bit for a class is set if the class has one or more concavities which include the x-coordinate in their acceptance ranges. The acceptance range in this respect includes the maximum error allowance, d, made during comparison of two features.

A similar array of bit arrays is constructed for the possible y-coordinates and directions of a concavity. The concavities of an unknown character will be used to look-up bit arrays corresponding to the position and direction of the concavity. The three arrays are then logically ANDed (processed through an AND gate), resulting in an array of bits indicating all the classes which will accept the concavity.

A similar operation on all the other features of the unknown character results in a set of bit arrays, one for each feature. The arrays are used to construct a single array, which gives the number of ones in each bit position. If the unknown character has features, and it is a perfect match with one of the standard templates, then the highest bit count will be n, in the position of the matching class. Comparison of the unknown character against all the classes which have a bit count of n will guarantee to find the correct class.

If the unknown character is not a perfect match to the relevant template, then it may have one or more extra features and/or missing features. Missing features will still result in a perfect response with the correct class, but an increased number of other classes will also give a perfect response, resulting in an increased search time.

If sufficient extra features are present, then it is possible that the correct template will not even be tested, since some other class may have more matching features, yielding a higher bit count. In this case, the correct class can still be found by reducing the target bit count when no classes are found with a sufficiently low match error.

Thus the look-up tables can be used to obtain a significant reduction in the number of templates which need to be compared with an unknown character, without any danger of missing the correct class. The typical reduction obtained in practice is of the order of 80–85%. This figure would be considerably higher if there were fewer classes which have only one significant feature, i.e. when symmetry is added.

To summarize the feature extraction facility uses a set of five features which is adequate for recognition of the entire ASCII character set. These features are: concavity, closure, line, axis and symmetry. Each of the above features can be detected in a time linearly related to the number of outline points in a character. The need to perform any kind of thinning operation is thus completely eliminated.

A training set of characters is used to produce the standard templates by a split and merge procedure. Firstly, classes are split where the same character has disjoint sets of features, such as with "a" and "a". Ambiguous characters are then merged into single classes where a simple operation may be used to distinguish them at a later stage of processing.

A flexible matching process is used to match unknown characters to class templates even when one or more features are absent, additional or out of the allowable acceptance range. A look-up table is used to reduce the number of templates against which an unknown character is tested.

Turning now to the text ordering process which is represented functionally in FIG. 12, as has been indicated previously a significant feature of the present arrangement is its ability to identify blocks of text and image within a page and to assign an actual reading order to the text blocks. A part of the text ordering facility is a process known as page segmentation which partitions a page of blob outlines output from the polygonal extraction into rectangular blocks. In carrying out this process it is assumed that the document comprises rectangular blocks of text or graphics. It is also assumed that the reading order is the newspaper reading order, that is to say blocks are read from top to bottom, left to right, but a wide column above narrow columns nests the subordinate columns. This is illustrated in FIG. 28a.

As has previously been emphasized the output from the edge extractor is a page of character outlines or blobs and the present arrangement and this contributes to the present arrangement being flexible enough to read text in many different fonts. It also renders the page segmentation less susceptible to differences in font size. Page segmentation is followed by a process to determine which of the blocks contain text and to perform final classification of their contents.

The process involved in page segmentation will be described initially. Essentially it comprises three stages, preparation, consolidation and partitioning itself.

Preparation will be dealt with initially. The actual partitioning algorithms work with a low resolution representation of the page. They need to know which parts of the pages are occupied by blobs or potential characters. Preparation is the first stage towards this. It takes a page of blobs and represents it in terms of a low resolution map where each cell in the page has value −1 if it is occupied or 0 otherwise.

First the bounding box of each non-spurious outline is dilated, i.e. expanded by a set amount. This amount can be fixed and can be chosen empirically. It should be noted that excluded from this step are all outlines which are likely to be lines or dots, and any outlines which have an abnormally large number of features associated with them. It has been found that this expansion is a coarse, but effective way of merging outlines which are close to each other in order to keep them in the same block. The box is expanded in three directions only since if boxes are expanded downwards large banner headlines run the risk of being associated with columns of text below them. The use of a factor rather than an absolute amount for dilation reinforces the font in dependence of the algorithms since white space within the block is related to font size.

In the current embodiment of the low resolution representation of the page, the resolution in each direction is ⅛ of the resolution of the page. Each positional cell within the page is assigned an integer value. Initially all cells which are covered by the expanded box of a blob have value −1 and all other cells have 0.

Turning to consolidation, an underlying assumption of text ordering is that text is arranged in rectangular blocks. After preparation the next step is to find rectangular areas within the low resolution map which are mainly occupied by blobs. The input to consolidation is a map with values 0 and −1. Its output is a map with information about these rectangular blocks. The map is searched for chunks of blobs, i.e. areas of the map with value −1. When a cell is found with value −1 the process tracks the edge around the area of occupied cells to which the cell belongs. A positive block number is associated with the chunk. During cracking all cells around the edge are assigned the negative of the block number. The algorithm uses the block number and its negative. Thus block numbers start at 2 since −1 is already used. They are allocated in ascending order. However they do not represent the eventual reading order of the page since this is established at the partitioning stage.

Figure 29:
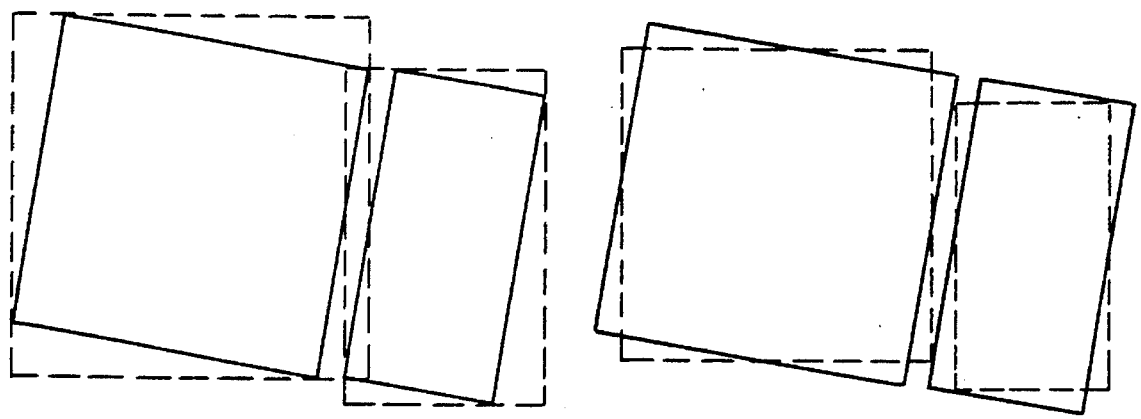

The segmentation algorithm relies on finding clear horizontal and vertical paths between the chunks of blobs. Sometimes a page may be skewed in which case, although these paths are obvious to the naked eye they may not be picked up by an algorithm which works with maximum extensive chunks. In order to reduce the risk of this the bounding rectangle of each chunk of blobs is eroded, i.e. shrunk on all sides by a set amount. This allows a simple negative value test for blobs which overlap the eroded rectangle while ensuring that a chunk will not be processed more than once since the process identifies a new chunk by −1 to the right of a 0 rather than a negative value to the right of the 0. The process is illustrated in FIG. 29 where the left-hand view shows simple text chunks on a skewed page and the right-hand view shows the effect of the erosion process referred to above.

All cells within the eroded rectangle of a block are assigned the block number as their value. This includes cells which have a value 0 prior to consolidation. Cells which belong to the original chunk, but which overlap outside the eroded rectangle have a negative value, −n if they are at the edge of the chunk, −1 otherwise.

Finally the page is partitioned into blocks according to the cells with positive value. To start a routine searches from left to right and top to bottom for a complete vertical path through the page between eroded rectangles with different positive values. When this is found another routine is called to search the left-hand part for a complete horizontal partition, while the first-mentioned routine continues to search in the right-hand part for further vertical partitions. If no partition is found the whole page is searched for a horizontal partition. Partition is terminated by the second routine when no further horizontal paths are to be found.

This algorithm assumes that the document can be partitioned into rectangular blocks by successively cutting into rectangles in a manner similar to that of a guillotine. The reading order is assumed to be that of a newspaper and the blocks are read top to bottom and left to right, but a wide column above a narrow column nests the narrower columns. The result is illustrated in FIG. 28(*a*). Thus the input to text ordering (FIG. 22) is a page of blobs and the output is a set of blocks which comprise rectangular loading boxes with contents.

In association with page segmentation the blobs are classified. Each blob within a block is passed through the feature extractor described above, and the number of potentially "spurious" blobs are noted. A blob is classed as spurious if it matches no known ASCII character, or if it is a dot or a line. The proportion of potentially spurious blobs to the total number of blobs is calculated, and if this is high the block is deemed to be non-text. Blocks which just contain single isolated blobs are noted as such, and not treated as text.

Ordering of text blocks. If the partitioning sequence described earlier is followed, then the blocks will be identified in "newspaper" reading order. Note that the block ordering problem is not unambiguous, but it is considered the most "reasonable" way of ordering, and is probably the best without recourse to a higher level of information (such as user intervention).

Ordering of text within blocks. The blobs within a block need to be associated into rows, and then the blobs and rows ordered. The text ordering process makes no assumptions about the order in which the blobs are received.

As each blob within the block is considered, its maximum and minimum y (vertical) position is noted. If the blob is the first considered, these y values are noted as the maximum and minimum y values for the first row. For each subsequent blob, it is noted whether it falls within an existing row. If it does, it is associated with that row and the row's maximum and minimum is modified. If it does not, then a new row is started.

Having considered all the blobs within the block in this way, a pass is made through the rows to check whether any rows noted need to be merged. For example, if the first two blobs considered for a row were a lower case i and its associated dot, then two distinct rows would have been started. A merging pass is therefore needed to associate these two rows into one.

When all the blobs have been associated into rows, the blobs within each row are sorted into x (horizontal) order. The rows are then sorted into decreasing y (vertical) order. The association and ordering of blobs within text blocks is then complete.

Deduction of whitespace. Once the text blobs have been correctly ordered, the position of whitespace characters within them needs to be deduced. This is done by applying a set of metrics to the spatial relationships between the blobs within the block.

Figure 30:
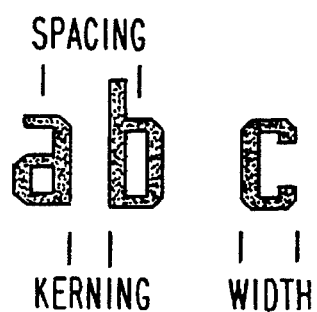

Each blob is associated with its right hand neighbor, and the distance between the blob's mid point and its neighbor's mid point (the spacing) is noted. The distance between the blob's right hand edge and its neighbor's left (the kerning) is also noted. Finally the blob's width is noted (see FIG. 30).

A decision is then made as to whether the text in the block is likely to be proportionally or non-proportionally spaced. This is made on the following basis (where IQR(x) is the inter quartile range of x). If IQR(spacing) is greater than IQR(kerning) then the text is proportionally spaced, otherwise it is non-proportional. The IQR was chosen as a measure because it is insensitive to the distribution's tail shape (which changes with justified/non-justified text), and it is stable with small sample set sizes.

The whitespace algorithm now depends on whether there is proportional or non-proportional text. For proportional text, the median kerning value is used and whitespace is inserted where the kerning value is greater than 2.0× this. (The 2.0 used here is an empirically evaluated figure. Note that the use of mode is intuitively correct, but may give stability problems for low sample set sizes, or high measurement resolutions. For this reason the median value is used.)

For non-proportional text, the median spacing value is used and whitespace is inserted where the kerning value is greater than 1.5× this. (The 1.5 used here is intuitively correct from the model of non-proportional text).

Association of blobs in deliberately broken characters. A feature of deliberate breaks (such as the body and the dot in lower case i) is that the two blobs within the same row overlap in x. Where this happens, the smaller of the two characters is assigned as the dot, and this information is passed on to the tests part of the text ordering process (see later).

Identification of potentially merged characters. A blob is identified as merged if it is over wide. This is determined from the distribution of the blob widths. A blob within a text block is also defined as potentially merged if it does not match any known ASCII character. Potentially merged blobs are candidates for segmentation by the merger/segmenter 15. The choice as to whether the segmentation was correct is made by the final classifier 16.

Figure 31:
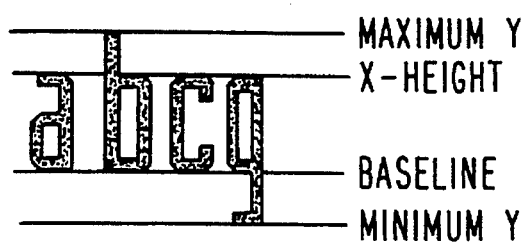

Resolution of intrinsic ambiguities. Feature extraction as described above matches a blob to a set of possible classes of ASCII characters, where each class contains characters which cannot be resolved by features, but can be solved when their size or position within a row is considered. In order to do this further data relevant to each row is required. The maximum and minimum y (vertical) are already noted for each row when the blobs are first associated into rows. It is also necessary to note the baseline position, i.e. the line on which characters without descenders sit, and the x-height, i.e. the vertical position of the top of a lower case "x" (see FIG. 31). In order to deduce these extra row metrics, an indication is required of each blob in the row's character type (with or without descender, "x"-height or with ascender). However this information is not available at this stage in the processing. Instead, a list is made of the classes which contain characters with descenders, and a list of the classes which are unambiguously lower case without ascenders. The information from a blob for baseline measurement is only used if it is a good match to a class which is not in the former list, and for x-height measurement if it is a good match to a class in the latter list. Values thus gained are smoothed into running totals in order to reduce sensitivity to error.

Within a row, each blob which has not been identified as a dot is tested to give a set of blob metrics which are used to help discriminate between possible characters within a class. The metrics used are: REL_HT, the relative height of the blob as compared to the distance between MAXIMUM Y and MINIMUM Y; V_POS, the vertical position of the center of the blob as compared to MAXIMUM Y and MINIMUM Y; and FILL. FILL is a special metric, used to discriminate between upper and lower case versions of the same character, by looking at the proportion of the blob in the region between X-HEIGHT and MAXIMUM Y.

The tests section of the text ordering process makes the decision as to which character from each class is the most likely by checking a data base on the ASCII characters. This data base contains information on each character's height, vertical position and whether or not it is dotted. This information is called the character's description. Each blob metric is split into zones, and a character's description is stored as a word where a set bit indicates that the corresponding blob metric may fall within this zone. Each blob has its own description formed, and from this a single ASCII character is chosen for each possible class passed on by feature extraction. If no character within a class fits well, then the match rating of the choice is reduced (the match rating is the measure of confidence produced by feature extraction). The output from the text ordering 12 to final classification for each blob is therefore one or more ASCII characters, together with a match rating for each.

Thus the text ordering facility provides the capability to analyze and make use of the structure of a slightly restricted but nonetheless representative set of compound documents. This is a significant feature of the present system.

A description will now be given of the final classifier 16. The feature extraction and blob classification steps (the "heart" of the recognition process) do not produce final decisions on the ASCII value associated with each blob, but instead provide data indicative of a set of classes of characters which the final character might be part of. Each class has a confidence value or match rating associated with it.

At this stage, therefore, there are a number of classes, each containing a number of ASCII characters, from which the final character can be chosen.

The membership of the classes is carefully chosen such that members of the same class have similar feature, but may be distinguished by the contextual geometry (position on line, size, presence of dot etc.). Thus "C" and "c" may present in the same class (they can be distinguished by height), but "O" and "0" must be in separate classes.

Because of this choice of class membership, the choice of which character from within each class can be chosen at the Text Ordering phase as described above.

After text ordering, therefore, a choice has to be made from a set of characters for each blob. The choice now is such that there are match ratings to help, but no further information from the physical layout or appearance of the blobs.

The final classifier makes use of text models to carry out its final classification. A description will be given first of these models followed by the way in which they are used to make the final classification.

Each model makes some assumptions about the structure of text. These models are in general language specific, in that different languages may need different databases, or may not conform to the models at all (this is especially the case with computer languages). The models described herein are likely to be valid for all European languages, albeit with a possible change of database.

(1) Lexical rules: Simple character-level syntactic rules can be developed assuming that the text unit can be identified as the set of characters between whitespace delimiters. Characters are classified as follows: A character can be alphanumeric or punctuation. An alphanumeric character can be alphabetic or numeric. An alphabetic character can be upper or lower case. If the first alphanumeric character in a text unit is alphabetic, then the string of characters from the first alphanumeric character to the last alphanumeric character is called a word. The lexical rules are then:

a) Numeric characters do not appear within words.

b) Upper case characters do not follow lower case characters in words.

c) Punctuation (except for the apostrophe) does not appear in words.

(2) Markov Methods: A Markov chain is a discrete stochastic process which can take one of a finite number of states at each increment. The probability of achieving state j in the next increment, when the current state is i, is purely a function of i and j and nothing else. Thus the process can be completely described by the transitional probabilities P(i,j), which are usually described in the form of a transition matrix T. If there are n possible states, then T is n×n. If we define a state probability vector $s_k$ such that the $i^{th}$ element of $s_k$ is the probability of being in the $i^{th}$ state at the $k^{th}$ increment, then we can write:

$$S_{k+1} = T s_k$$

Text is not a true Markov process, but it can be modelled as one with some success. This is because of both spelling conventions (such as u following q) and the need for words to be pronounceable (so that g is unlikely to follow j). For each alphabetic character (ignoring its case) as a possible state, and each character occurrence as an increment, then it is possible to use the 26×26 transition matrix to help in selection of the next character. All that is required is to modify match ratings in order to reflect the probability of making the given transition.

A Markov chain can be applied "backwards" by considering the transition probabilities from the character to be finalized and the next.

Making the choices either "backwards" or "forwards" as described above is not ideal, as it assumes confidence in the letter (state from which the transition is being made. This problem goes away when decisions are not made on the character level, but at the word level, as described below.

The above could be extended to making a choice based on the previous m−1 characters. However this requires consideration of the states as the $26^{(m-1)}$ possible combinations. This suggests a transition matrix of $26^{(m-1)} \times 26^{(m-1)}$. In fact, only $26^m$ entries are non-zero, as not all transitions are possible (e.g. it is not possible to go from state "abc" to "xyz", only "bca" "bcb", "bcc" etc.) The transition table needed for the above becomes large quite quickly, and their use for m greater than 2 is debatable. Rather than using large values of m, dictionary methods are better, as described now.

(3) Dictionary Methods: Text units (strings between whitespace) can be reduced to words which are either in a dictionary, or can be derived from entries in the dictionary using a specified set of production rules. Methods of generating, i.e. and production rules are known, see for example "Development of a Spelling List", M Douglas Mcilroy, IEEE Trans. Comms. January 1982.

The final classifier can use the dictionary search method in the manner described in "A minimum Distance Search Technique" by B. Aldefeld, Bell System Technical Journal, October 1980.

The final classifier uses the above as follows:

The character blobs on a page are divided into blocks, ordered within these blocks, sorted into rows and whitespace is deduced by the text ordering phase as described earlier. The appropriate character is chosen from each of the classes as described above by the "tests" part of text ordering. The final classification phase assembles the text units (between whitespace), and generates each possible text unit from the character options passed to it. Each possible text unit has a total rating, which is simply the product of the individual probabilities for each of the character options. Each possible text unit can then have its total rating modified to reflect how well it conforms to each of the text models, as shown below.

The text units are stripped down into words, as described in (1) above by procedure punc strip(). The three lexical rules then translate into the following implementation rules:

No transition from alphabetic to numeric character within words.

No transition from lowercase to uppercase characters.

No contained punctuation (except for the apostrophe).

Markov chains are applied to give a probability of having taken the given path for a word option. This obviates the need for running the analysis backwards and forwards, and as calculation is made of the path probability for a whole word, there is no need to have any confidence in any particular character.

The path probability is the product of the P(i,j) for each transition with the word. A higher probability shows that the word is more likely to be correct (within the Markov model).

The Dictionary Search technique can be implemented using a commercially available program.

It should be noted that it is unnecessary to use both Markov models and dictionary methods. It should also be noted, however, that Markov models take significantly less space for their database.

Although certain embodiments of the present invention have been described in detail, one of ordinary skill will realize numerous variations and modifications are possible without departing from the spirit of the present invention. Accordingly, reference should be made to the appended claims to ascertain the scope of the present invention.

We claim:

1. An optical character recognition system comprising:

scanning means for optically scanning a document to produce a grey level image thereof;

edge extractor means comprising:

identifier means for identifying points along an edge within said grey level image using grey level values so that said points so identified represent substantially the strongest edge;

tracking means for automatically tracking the edge using grey level values to determine if the edge forms a closed loop and if so defining the edge as an outline;

said identifier means identifying alternate points of the edge if the edge does not form a closed loop and said tracking means automatically tracking an alternate edge associated with said alternate points together with at least some of said points on said strongest edge and determining whether the alternate edge forms a closed loop and if so defining the alternate edge as the outline; and means for producing data indicative of an object based on at least one outline identified in said image, each outline comprising at least a part of one character; and processing means for processing the data provided by said edge extractor means to produce an output representative of the characters in said image.

2. The system as claimed in claim 1, wherein the outlines identified by said edge extractor means are subjected to polygonal approximation means for processing the data prior to further processing by (1) following the outline of each object to identify a series of points on said outline having a predetermined characteristic, (2) measuring the depth of the concavity between each adjacent pair of said points, and (3) removing concavities having depths less than a predetermined value, whereby the output of said polygonal approximation means approximates the outlines of the characters in said image by a sequence of straight lines.

3. The system as claimed in claim 1, wherein the grey level image comprises a pixel array, said edge extractor being arranged to locate edges by means of an edge operator which generates edge values for each pixel from the grey level value of pixels adjacent to said pixel.

4. The system as claimed in claim 3, wherein the edge operator process a plurality of grey level values and is defined with respect to a 3×3 matrix neighborhood of x as follows:

| 5 | 6 | 7 |
|---|---|---|
| 4 | X | 0 |
| 3 | 2 | 1 | in which the numbers represent the chain codes of adjacent points, the edge value of an adjacent point with chain code n being:

grey level (n+1) (modulo 8)-grey level (n−1) (modulo 8).

5. The system as claimed in claim 4, wherein each of the edges is traced in accordance with an algorithm in which, for a point with chain code n, edge values are derived for points with chain codes n−2, n−1, n, n+1, and n+2 from the current position X, the highest edge value is marked as the current position X and defines the strongest point, and the process is repeated to identify and mark successive strongest points.

6. The system as claimed in claim 1, wherein said processing means includes a page segmentation facility for arranging the data indicative of the outlines into a desired order and means for identifying particular features of said outlines.

7. The system as claimed in claim 6, wherein said page segmentation facility identifies groups of said outlines to form said outlines into blocks of outlines and arranges said blocks into said desired order.

8. The system as claimed in claim 7, wherein the page segmentation facility can identify blocks as text or non-text blocks by determining whether the proportion of spurious characters in the block exceeds a defined threshold value.

9. The system as claimed in claim 8, wherein the block type is determined on the basis of a classification of each outline.

10. The system as claimed in claim 9, wherein data representative of the classification of each outline is provided by an object outline classification process.

11. The system as claimed in claim 8, wherein the block order is determined in accordance with the manner in which the blocks nest.

12. The system as claimed in claim 6, wherein the output of said page segmentation facility comprises data representative of at least one possible class to which the object represented by said at least one outline belongs together with a weighting value, said weighting value indicating the probability that the outline is associated with a particular class.

13. The system as claimed in claim 1, wherein said edge extractor means further comprises a feature extraction facility for processing said data to identify particular features of each outline and to classify the outlines into classes in accordance with the identified features.

14. The system as claimed in claim 13, wherein the features comprise any one of concavity, closure, axis, symmetry or line either singly or in combination.

15. The system as claimed in claim 6, wherein said processing means includes a final classification stage for making the final classification of each of said outlines, wherein said final classification stage operates on the data output by the page segmentation facility using lexical rules, Markov chain analysis and dictionary search techniques.

16. The system as claimed in claim 15, wherein the output of said final classification stage is in ASCII code.

17. The system as claimed in claim 1, wherein the operation of the edge extractor derives an edge value for a pixel based on the grey level values of pixels immediately adjacent to the pixel based on the direction of tracking.

18. An image processing system comprising an edge extractor for automatically producing data indicative of the outline of objects in a grey level image generated by an optical scanning device, wherein said outline comprises at least part of one or more characters, said grey level image comprising a pixel array, said edge extractor comprising means for sequentially scanning said pixel array to locate a first strongest edge and for tracing the outline of one of the objects starting with said first strongest edge and by locating a plurality of additional strongest edges contiguous with one another to determine whether or not the entire outline can be traced using only said first and additional strongest edges and automatically locating alternate edges that are used to complete the entire outline when said additional strongest edges do not complete the outline, said edge extractor further comprising edge operator means for generating edge values for each pixel using grey level values, wherein the operation of the edge extractor is such that the edge value for a current pixel is derived from the relative values of the grey level values of the pixels which are immediately adjacent to the current pixel based on the direction of tracing.

19. The system as claimed in claim 18, wherein the edge operator processes a plurality of grey level values and is defined with respect to a 3×3 neighborhood matrix of x as follows:

| 5 | 6 | 7 |
|---|---|---|
| 4 | X | 0 |
| 3 | 2 | 1 | in which the members represent the chain codes of adjacent points, the edge value of an adjacent point with chain code n being:

grey level (n+1) (modulo 8)-grey level (n−1) (modulo 8).

20. The system as claimed in claim 19, wherein said outline is traced in accordance with an algorithm in which for a point with chain code n, edge values are derived for points with chain codes (n−2), (n−1), n, (n+1), and (n+2) from the current position, the point with the strongest edge values is marked, and the process is repeated to identify and mark successive strongest edge values.

21. The system according to claim 18, wherein the edge extractor further comprises a polygonal approximation facility for approximating the outline of an object generated by the edge extractor by at least one polygon.

22. An edge extractor according to claim 18, wherein the edge outline is represented by a closed loop.

23. An image processing system comprising means for scanning a document to generate an image represented by grey level values and automatically producing data representative of an outline of an object in the image comprising an edge extractor for tracing said outline by generating an edge value for a pixel derived from the grey level values of the pixels which are immediately adjacent to said pixel based on the direction of tracing, said edge extractor locating a strongest edge based on said edge values and tracing said outline by locating additional strongest edges if said additional strongest edges in combination complete the outline, said edge extractor automatically locating an alternate edge to complete the outline when said additional strongest edges do not complete the outline, said system further comprising a page segmentation facility for identifying groups of outlines to form said groups into blocks of outlines and for arranging said blocks into order, wherein said outlines are representative of at least a portion of one or more characters.

24. The system as claimed in claim 23, wherein the page segmentation facility can identify blocks as text or non-text by determining whether a proportion of spurious characters in the block exceeds a defined threshold value.

25. The system as claimed in claim 23, wherein the block type is determined on the basis of a classification of each outline.

26. The system as claimed in claim 25, wherein the data representing the classification of each outline is provided by an object outline classification process.

27. The system as claimed in any claim 24, wherein the block order is determined in accordance with the manner in which the blocks nest.

28. An image processing system comprising means for scanning a document to generate an image represented by grey level values and automatically producing output data representative of an outline of an object in the image, the system comprising an edge extractor for tracing said outline by generating an edge value for a pixel derived from the grey level values of pixels immediately adjacent to said pixel relative to the direction of tracing, said edge extractor locating a strongest edge based on said edge values and tracing said outline by locating additional strongest edges if said additional strongest edges in combination complete the outline, said edge extractor automatically locating an alternate edge to complete the outline when said additional strongest edges do not complete the outline, said system further comprising a facility for processing said data to identify particular features of each outline and to classify the outlines into classes of characters likely to represent the character for each outline in accordance with the identified features, and for classifying as spurious outlines those outlines not representing a character, wherein the features identified comprise one or more of concavity, closure, axis, symmetry and line.

29. The system as claimed in claim 28, wherein said output data is produced by said edge extractor.

30. The system as claimed in claim 28, wherein the classification data includes a rating or weighting value indicative of the strength of the match of the outline to the class with which the object has been associated.

31. A method of processing a document to produce data representative of characters on said document, said method comprising the steps of:

scanning said document to produce a pixel array of grey level values representing a grey level image of the document;

scanning the grey level values and for each grey level value comparing the grey level values of pixels immediately on either side of the pixel being scanned;

locating a first edge associated with one of the pixels based on the grey level values so compared;

automatically locating additional edges and tracing a strongest edge in said grey level image representing an outline comprising at least a portion of one or more characters in said image by comparing the grey level values immediately adjacent the pixel associated with each said additional edge; and determining whether or not said strongest edge forms a complete outline;

automatically identifying an alternate edge that does form a complete outline when said strongest edge does not form a complete outline, wherein the alternate edge is identified by comparing grey level values;

processing data representing said strongest and said alternate edges that form complete outlines to provide data representative of the characters in said image, said processing step comprising automatically segmenting and classifying the data into blocks representative of a plurality of outlines, each outline comprising at least a portion of one or more characters.

32. The method as claimed in claim 31, wherein the data is subjected to a polygonal approximation step.

33. The method as claimed in claim 31, wherein said processing step comprises identifying a feature or features of said complete outlines and providing data representative of a class to which the object represented by said complete outlines belong.

34. A method as claimed in claim 33, wherein said features include concavities and closures.

* * * * *